US012189102B2

(12) United States Patent
Hagiwara

(10) Patent No.: US 12,189,102 B2
(45) Date of Patent: Jan. 7, 2025

(54) ZOOM LENS AND IMAGE PICKUP APPARATUS HAVING THE SAME

(71) Applicant: CANON KABUSHIKI KAISHA, Tokyo (JP)

(72) Inventor: Yasuaki Hagiwara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/504,947

(22) Filed: Nov. 8, 2023

(65) Prior Publication Data

US 2024/0069313 A1 Feb. 29, 2024

Related U.S. Application Data

(63) Continuation of application No. 17/385,676, filed on Jul. 26, 2021, now Pat. No. 11,846,763.

(30) Foreign Application Priority Data

Aug. 4, 2020 (JP) .................................. 2020-132328

(51) Int. Cl.
*G02B 15/14* (2006.01)
*G02B 15/16* (2006.01)
*G02B 27/64* (2006.01)

(52) U.S. Cl.
CPC ......... *G02B 15/1461* (2019.08); *G02B 15/16* (2013.01); *G02B 27/646* (2013.01)

(58) Field of Classification Search
None
See application file for complete search history.

(56) References Cited

U.S. PATENT DOCUMENTS

| 2006/0268428 A1* | 11/2006 | Kuroda | G02B 15/1461 |
| | | | 359/693 |
| 2014/0009822 A1* | 1/2014 | Dong | C03B 37/0122 |
| | | | 385/127 |
| 2014/0118839 A1* | 5/2014 | Sugita | G02B 15/173 |
| | | | 359/683 |
| 2020/0264413 A1* | 8/2020 | Yamanaka | G02B 15/1461 |

FOREIGN PATENT DOCUMENTS

| JP | 2013257507 A | 12/2013 |
| JP | 2018022058 A | 2/2018 |

* cited by examiner

*Primary Examiner* — Robert E. Tallman
(74) *Attorney, Agent, or Firm* — Canon U.S.A., Inc. IP Division

(57) ABSTRACT

A zoom lens includes, in order from an object side to an image side, a first lens unit having a positive refractive power, a second lens unit having a negative refractive power, a third lens unit having a positive refractive power, and a rear unit that includes a plurality of lens units having negative refractive powers and a plurality of lens units having positive refractive powers, each distance between adjacent lens units changing during zooming. During zooming from a wide-angle end to a telephoto end, the first lens unit moves to the object side, and the second lens unit moves to the image side and thereafter moves to the object side. A predetermined condition is satisfied.

22 Claims, 11 Drawing Sheets

ZOOM LENS AND IMAGE PICKUP APPARATUS HAVING THE SAME

CROSS-REFERENCE TO RELATED APPLICATION

This application is a Continuation of U.S. application Ser. No. 17/385,676, filed Jul. 26, 2021, which claims priority from Japanese Patent Application No. 2020-132328, filed on Aug. 4, 2020 which is hereby incorporated by reference herein in its entirety.

BACKGROUND OF THE DISCLOSURE

Field of the Disclosure

The aspect of the embodiments relates to a zoom lens suitable for an image pickup apparatus such as a digital video camera, a digital still camera, a broadcasting camera, a silver halide film camera, and a surveillance camera.

Description of the Related Art

Zoom lenses used in image pickup apparatuses are required to be small and to have high zoom ratios and high optical performance.

Each of Japanese Patent Application Laid-Open Nos. ("JPs") 2016-148731 and 2013-235093 describes, as a zoom lens for realizing both a high zoom ratio and high optical performance, a zoom lens including, in order from an object side to an image side, a first lens unit having a positive refractive power, a second lens unit having a negative refractive power, a third lens unit having a positive refractive power, and a plurality of lens units.

However, although the zoom lenses of JPs 2016-148731 and 2013-235093 has the high zoom ratios and the high optical performance, they do not satisfy the demands for small size. For realizing the small size, it is important to properly set a zoom type and a moving lens unit during zooming.

SUMMARY OF THE DISCLOSURE

A zoom lens according to one aspect of the embodiments includes, in order from an object side to an image side, a first lens unit having a positive refractive power, a second lens unit having a negative refractive power, a third lens unit having a positive refractive power, and a rear unit that includes a plurality of lens units having negative refractive powers and a plurality of lens units having positive refractive powers, each distance between adjacent lens units changing during zooming. During zooming from a wide-angle end to a telephoto end, the first lens unit moves to the object side, and the second lens unit moves to the image side, and thereafter moves to the object side. A predetermined condition is satisfied.

An image pickup apparatus including the above zoom lens also constitutes another aspect of the embodiments.

Further features of the disclosure will become apparent from the following description of exemplary embodiments with reference to the attached drawings.

DESCRIPTION OF THE EMBODIMENTS

Figure 1:
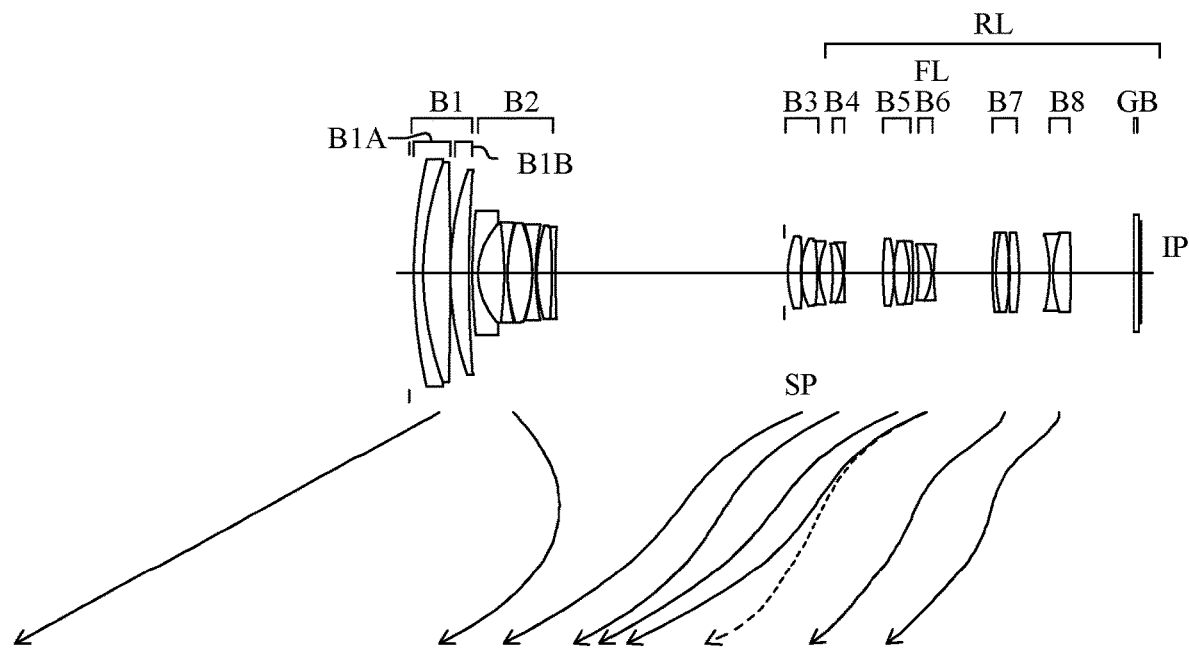
FIG. 1 is a sectional view of lenses according to an Example 1 of the present disclosure.

The zoom lens according to an embodiment of the present disclosure includes, in order from an object side to an image side, a first lens unit B1 having a positive refractive power, i.e., an optical power which is an inverse of a focal length, a second lens unit B2 having a negative refractive power, a third lens unit B3 having a positive refractive power, and a rear unit RL following on the image side and including a plurality of lens units having negative refractive powers and a plurality of lens units having positive refractive powers. Specifically, the rear unit RL includes, in order from the object side to the image side, at least fourth to seventh lens units B4 to B7, each of which has a positive or negative refractive power. Each distance between adjacent lens units changes during zooming.

In the zoom lens according to the embodiment of the present disclosure, during zooming from a wide-angle end to a telephoto end, the first lens unit B1 moves on an optical axis to the object side, and the second lens unit B2 moves on the optical axis to the image side and thereafter to the object side.

The following expressions are satisfied:

$$5.50 < f1/|f2| < 7.50 \tag{1}$$

$$0.56 < m1/f1 < 1.19 \tag{2}$$

where f1 represents a focal length of the first lens unit B1, f2 represents a focal length of the second lens unit B2, and m1 represents a moving amount of the first lens unit B1 during zooming from the wide-angle end to the telephoto end. In this embodiment, a sign of the moving amount is assumed to be negative when a position of the first lens unit B1 at the telephoto end is on the object side of that at the wide-angle end, and the sign of the moving amount is assumed to be positive when the position of the first lens unit B1 at the telephoto end is on the image side of that at the wide-angle end.

When the above inequalities (1) and (2) are satisfied, it is possible to realize a zoom lens having both a high zoom ratio and good optical performance while having a small size.

The zoom lens according to the embodiment of the present disclosure includes, in order from the object side to the image side, the first lens unit having the positive refractive power, the second lens unit having the strong negative refractive power, the third lens unit having the positive refractive power, and the rear unit including the plurality of lens units. With such a configuration, both the high zoom ratio and the high optical performance can be realized.

The zoom lens according to the embodiment of the present disclosure includes the rear unit RL on the image side, and the rear unit includes the plurality of negative lens units and the plurality of positive lens units so that various aberrations are reduced while the zoom ratio is high.

In the zoom lens according to the embodiment of the present disclosure, during zooming from the wide-angle end to the telephoto end, the first lens unit B1 moves on the optical axis to the object side, and the second lens unit B2 moves on the optical axis to the image side and thereafter to the object side. Thereby, both the high zoom ratio and the small size are realized.

The inequality (1) defines ranges of the focal length of the first lens unit B1 and the focal length of the second lens unit B2 by a ratio thereof. If the focal length of the first lens unit B1 is so large that the value is larger than the upper limit of the inequality (1), aberration is easily corrected, but the moving amount of a movable unit in the first lens unit B1 increases during zooming, making it difficult to reduce the size. If the focal length of the first lens unit B1 is so small that the value is smaller than the lower limit of the inequality (1), it is difficult to correct spherical aberration at the telephoto end.

The inequality (2) defines ranges of the moving amount of the first lens unit B1 from the wide-angle end to the telephoto end and the focal length of the first lens unit B1 by a ratio thereof. If the moving amount of the first lens unit B1 is so large that the value is larger than the upper limit of the inequality (2), aberration is easily corrected, but it is difficult to reduce the size. If the moving amount of the first lens unit B1 is so small that the value is smaller than the lower limit of the inequality (2), the size may be reduced, but it is particularly difficult to correct spherical aberration at the telephoto end.

Focusing may be performed by the strongest negative lens unit in the rear unit RL. The strongest negative lens unit in the rear unit RL is likely to have a relatively small diameter in the entire system, and thus the focusing driving apparatus can be made small.

Further, focusing may be performed by a sixth lens unit B6 having a negative refractive power so that various aberrations are corrected well during zooming.

A negative lens unit closest to a diaphragm in the rear unit RL may be used as an image stabilization lens unit by moving the lens unit in a direction including a component of a direction orthogonal to the optical axis during image stabilization. In the rear unit RL, the negative lens unit close to the diaphragm easily reduces aberration variation during image stabilization and is easily made to have a small diameter, and thus it is possible to realize a small-sized image stabilization driving apparatus.

Image stabilization may be performed by a fourth lens unit B4 having a negative refractive power so that various aberrations are corrected well during image stabilization.

The following inequality may be satisfied:

$$2.71 < |fr/f2| < 6.53 \tag{3}$$

where f2 represents the focal length of the second lens unit B2, and fr represents a combined focal length of the rear unit RL at the wide-angle end.

The inequality (3) defines ranges of an absolute value of the focal length of the second lens unit B2 and the combined focal length of the rear unit by a ratio thereof. If the absolute value of the focal length of the second lens unit B2 is so small that the value is larger than the upper limit of the inequality (3), a magnification variation amount is easily ensured, but field curvature particularly increases at the wide-angle end. If the absolute value of the focal length of the second lens unit B2 is so large that the value is smaller than the lower limit of the inequality (3), aberration is easily corrected, but a moving amount during zooming increases for ensuring a desired magnification variation amount, making it difficult to reduce the size.

The following inequality may be satisfied:

$$1.61 < f1/f3 < 3.55 \tag{4}$$

where f1 represents the focal length of the first lens unit B1, and f3 represents a focal length of the third lens unit B3.

The inequality (4) defines ranges of the focal length of the first lens unit B1 and the focal length of the third lens unit B3 by a ratio thereof. If the focal length of the first lens unit B1 is so large that the value is larger than the upper limit of the inequality (4), aberration is easily corrected, but the moving amount of the first lens unit B1 during zooming increases for ensuring the desired magnification variation amount, making it difficult to reduce the size. If the focal length of the first lens unit B1 is so small that the value is smaller than the lower limit of the inequality (4), the size may be reduced, but it is particularly difficult to correct spherical aberration at the telephoto end.

The following inequality may be satisfied:

$$0.23 < |f2|/f3 < 0.53 \tag{5}$$

where f2 represents the focal length of the second lens unit B2 and f3 represents the focal length of the third lens unit B3.

The inequality (5) defines ranges of the absolute value of the focal length of the second lens unit B2 and the focal length of the third lens unit B3 by a ratio thereof. If the focal length of the third lens unit B3 is so small that the value is larger than the upper limit of the inequality (5), aberration is easily corrected, but a moving amount of the third lens unit B3 during zooming increases for ensuring the desired magnification variation amount, making it difficult to reduce the size. If the focal length of the third lens unit B3 is so large that the value is smaller than the lower limit of the inequality (5), the size may be reduced, but it is particularly difficult to correct spherical aberration at the telephoto end.

The following inequality may be satisfied:

$$0.38 < f2/ff < 1.02 \tag{6}$$

where ff represents a focal length of a lens unit having the strongest negative refractive power in the rear unit RL, i.e., a lens unit having a focal length of the smallest absolute value in the plurality of lens units having the negative refractive powers included in the rear unit RL, and f2 represents the focal length of the second lens unit B2.

The inequality (6) defines ranges of the focal length of the lens unit having the strongest negative refractive power in the rear unit RL, which performs focusing, and the focal length of the second lens unit B2 by a ratio thereof. If the focal length of the second lens unit B2 is so large that the value is larger than the upper limit of the inequality (6), the desired magnification variation amount is easily ensured, but it is particularly difficult to correct field curvature at the wide-angle end. If the focal length of the second lens unit B2 is so small that the value is smaller than the lower limit of the inequality (6), aberration is easily corrected, but the moving amount during zooming increases for ensuring the desired magnification variation amount, making it difficult to reduce the size.

The following inequality may be satisfied:

$$0.62 < |f2|/skw < 1.60 \tag{7}$$

where f2 represents the focal length of the second lens unit B2, skw represents a back focus at the wide-angle end.

The inequality (7) defines ranges of the absolute value of the focal length of the second lens unit B2 and the back focus at the wide-angle end by the ratio thereof. If the absolute value of the focal length of the second lens unit B2 is so large that the value is larger than the upper limit of the inequality (7), the desired magnification variation amount is easily ensured, but it is particularly difficult to correct field curvature at the wide-angle end. If the absolute value of the focal length of the second lens unit B2 is so small that the value is smaller than the lower limit of the inequality (7), aberration is easily corrected, but the moving amount during zooming increases for ensuring the desired magnification variation amount, making it difficult to reduce the size.

The following inequality may be satisfied:

$$1.70 < f3/skw < 4.39 \tag{8}$$

where f3 represents the focal length of the third lens unit B3 and skw represents the back focus at the wide-angle end.

The inequality (8) defines ranges the focal length of the third lens unit B3 and the back focus at the wide-angle end by a ratio thereof. If the focal length of the third lens unit B3 is so large that the value is larger than the upper limit of the inequality (8), the desired magnification variation amount is easily ensured, but it is particularly difficult to correct spherical aberration at the telephoto end. If the focal length of the third lens unit B3 is so small that the value is smaller than the lower limit of the inequality (8), aberration is easily corrected, but the moving amount during zooming increases for ensuring the desired magnification variation amount, making it difficult to reduce the size.

The following inequality may be satisfied:

$$0.17 < f2/fsi < 0.38 \tag{9}$$

where f2 represents the focal length of the second lens unit B2, and fsi represents the focal length of the lens unit having the negative refractive power closest to the diaphragm in the rear unit RL.

The inequality (9) defines ranges of the focal length of the second lens unit B2 and the focal length of the lens unit having the negative refractive power closest to the diaphragm in the rear unit RL, which performs image stabilization, by a ratio thereof. If the focal length of the second lens unit B2 is so large that the value is larger than the upper limit of the inequality (9), the size may be reduced, but it is particularly difficult to correct field curvature at the wide-angle end. If the focal length of the second lens unit B2 is so small that the value is smaller than the lower limit of the inequality (9), aberration is easily corrected, but the moving amount during zooming increases for ensuring the desired magnification variation amount, making it difficult to reduce the size.

The following inequality may be satisfied:

$$0.26 < f1/ft < 0.54 \tag{10}$$

where f1 represents the focal length of the first lens unit B1, and ft represents a focal length of the entire system at the telephoto end.

The inequality (10) defines ranges of the focal length of the first lens unit B1 and the focal length of the entire system at the telephoto end by a ratio thereof. If the focal length of the first lens unit B1 is so large that the value is larger than the upper limit of the inequality (10), aberration is easily corrected, but the moving amount of the first lens unit B1 during zooming increases for ensuring the desired magnification variation amount, making it difficult to reduce the size. If the focal length of the first lens unit B1 is so small that the value is smaller than the lower limit of the inequality (10), the size may be reduced, but it is particularly difficult to correct spherical aberration at the telephoto end.

The following inequality may be satisfied:

$$0.72 < |f2|/fw < 1.67 \tag{11}$$

where f2 represents the focal length of the second lens unit B2, and fw represents a focal length of the entire system at the wide-angle end.

The inequality (11) defines ranges of the absolute value of the focal length of the second lens unit B2 and the focal length of the entire system at the wide-angle end by a ratio thereof. If the absolute value of the focal length of the second lens unit B2 is so large that the value is larger than the upper limit of the inequality (11), the desired magnification variation amount is easily ensured, but it is particularly difficult to correct field curvature at the wide-angle end. If the absolute value of the focal length of the second lens unit B2 is so small that the value is smaller than the lower limit of the inequality (11), aberration is easily corrected, but the moving amount during zooming increases for ensuring the desired magnification variation amount, making it difficult to reduce the size.

The following inequality may be satisfied:

$$0.11 < f3/ft < 0.24 \tag{12}$$

where f3 represents the focal length of the third lens unit B3 and ft represents the focal length of the entire system at the telephoto end.

The inequality (12) defines ranges of the focal length of the third lens unit B3 and the focal length of the entire system at the telephoto end by a ratio thereof. If the focal length of the third lens unit B3 is so large that the value is larger than the upper limit of the inequality (12), aberration is easily corrected, but the moving amount of the first lens unit B1 during zooming increases for ensuring the desired magnification variation amount, making it difficult to reduce the size. If the focal length of the third lens unit B3 is so small that the value is smaller than the lower limit of the inequality (12), the size may be reduced, but it is particularly difficult to correct spherical aberration at the telephoto end.

The second lens unit B2 may include two or more positive lenses and three or more negative lenses so that lateral chromatic aberration and on-axis chromatic aberration are corrected well.

The second lens unit B2 may include two positive lenses and four or more negative lenses.

Each lens may move on the optical axis during zooming so as to reduce aberration variation. During zooming from the wide-angle end to the telephoto end, all the lens units in the rear unit RL may move to the object side along the optical axis.

The rear unit RL may include a fifth lens unit B5 having a positive refractive power and a seventh lens unit B7 having a positive refractive power so that aberration is corrected well.

The numerical ranges of the inequalities (1) to (12) may be set as follows.

$$5.80 < f1/|f2| < 7.21 \quad (1a)$$

$$0.67 < m1/f1 < 1.02 \quad (2a)$$

$$3.25 < fr/|f2| < 5.60 \quad (3a)$$

$$1.93 < f1/f3 < 3.04 \quad (4a)$$

$$0.28 < |f2|/f3 < 0.45 \quad (5a)$$

$$0.46 < f2/ff < 0.87 \quad (6a)$$

$$0.75 < |f2|/skw < 1.37 \quad (7a)$$

$$2.04 < f3/skw < 3.76 \quad (8a)$$

$$0.21 < f2/fsi < 0.33 \quad (9a)$$

$$0.31 < f1/ft < 0.46 \quad (10a)$$

$$0.86 < |f2|/fw < 1.43 \quad (11a)$$

$$0.13 < f3/ft < 0.20 \quad (12a)$$

The numerical ranges of the inequalities (1a) to (12a) may be set as follows.

$$6.18 < f1/|f2| < 6.99 \quad (1b)$$

$$0.75 < m1/f1 < 0.89 \quad (2b)$$

$$3.66 < fr/|f2| < 4.90 \quad (3b)$$

$$2.18 < f1/f3 < 2.66 \quad (4b)$$

$$0.31 < |f2|/f3 < 0.40 \quad (5b)$$

$$0.52 < f2/ff < 0.76 \quad (6b)$$

$$0.84 < |f2|/skw < 1.20 \quad (7b)$$

$$2.30 < f3/skw < 3.29 \quad (8b)$$

$$0.23 < f2/fsi < 0.29 \quad (9b)$$

$$0.35 < f1/ft < 0.41 \quad (10b)$$

$$0.97 < |f2|/fw < 1.25 \quad (11b)$$

$$0.14 < f3/ft < 0.18 \quad (12b)$$

As described above, the zoom lens according to the embodiment of the present disclosure can realize a small-sized zoom lens having a high zoom ratio and good optical performance over the entire zoom range from the wide-angle end to the telephoto end.

Examples of the present disclosure will be described in detail below based on the attached drawings.

Example 1

FIG. 1 illustrates a sectional view of lenses at a wide-angle end, i.e., a short focal length end, and at a telephoto end, i.e., a long focal length end, of a zoom lens according to an Example 1 of the present disclosure.

Figure 2A:
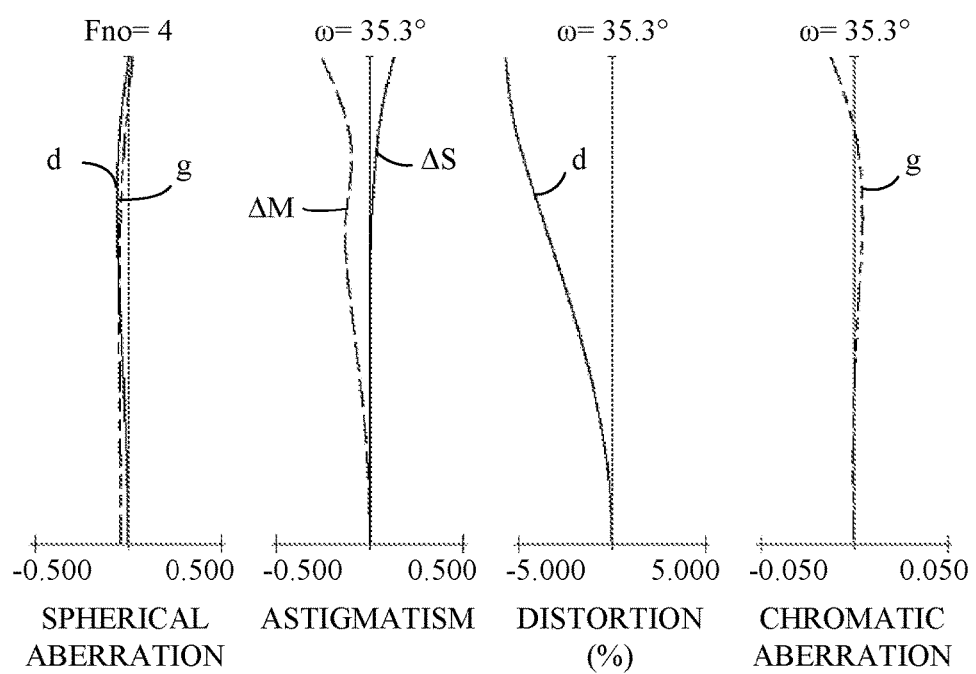
FIGS. 2A to 2C are aberration diagrams at a wide-angle end (A), at middle (B), and at a telephoto end (C) when the zoom lens focuses on an infinite distant object according to the Example 1 of the present disclosure.
Figure 2B:
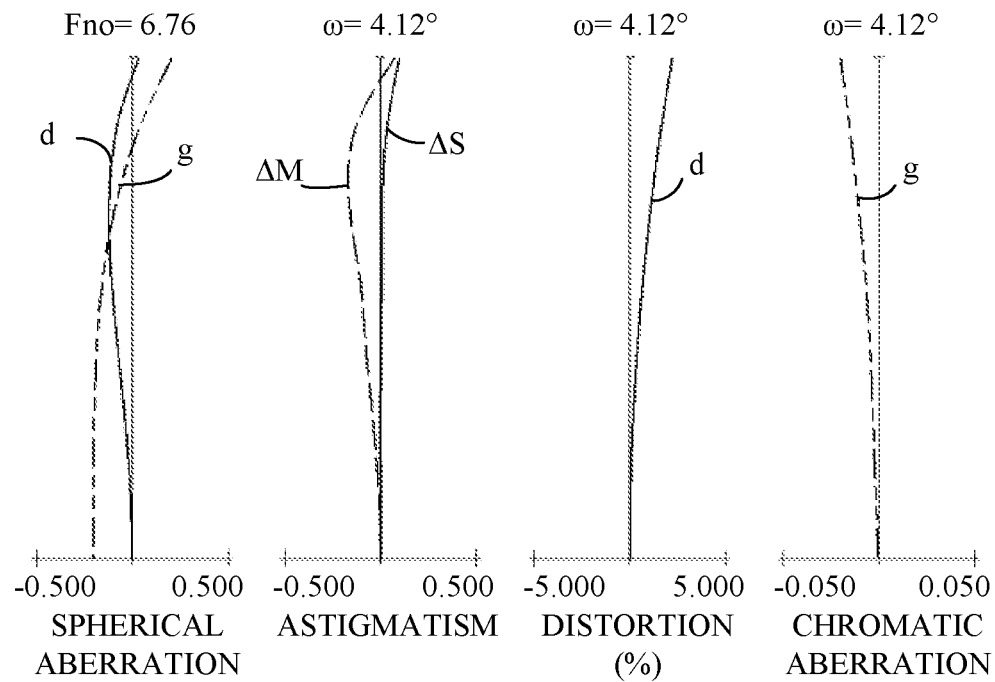
Figure 2C:
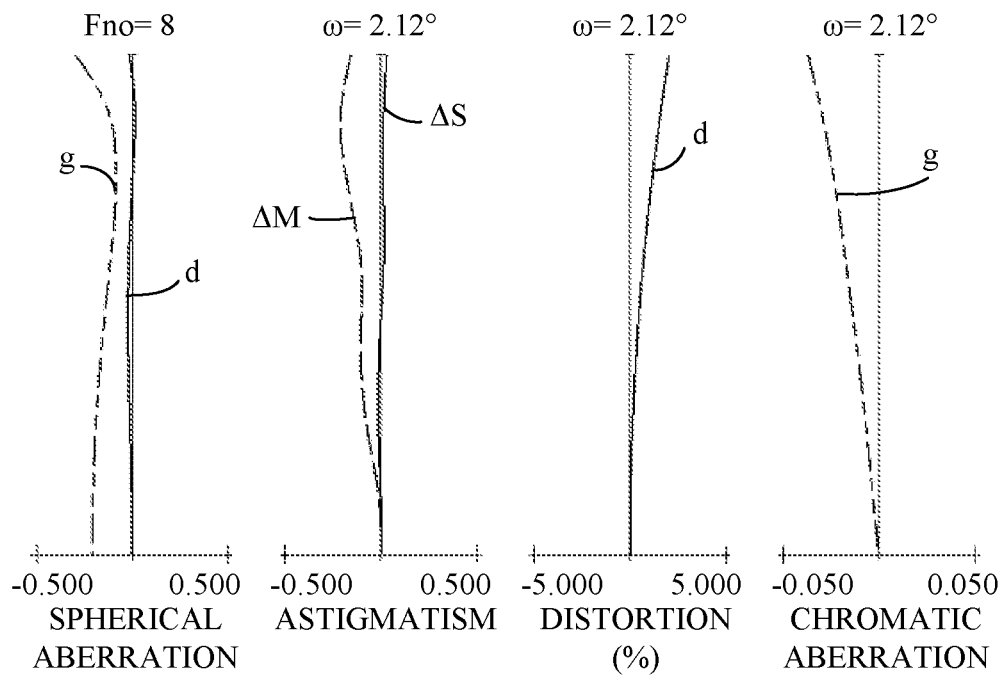

FIGS. 2A to 2C are aberration diagrams at the wide-angle end, middle zoom position, and telephoto end when the zoom lens of the Example 1 focuses on an infinite distant object, respectively.

The zoom lens of the Example 1 has a high zoom ratio of about 19 times. The zoom lens of the Example 1 includes, in order from an object side to an image side, a first lens unit B1 having a positive refractive power, a second lens unit B2 having a negative refractive power, a third lens unit B3 having a positive refractive power, and a rear unit RL following on the image side. The rear unit RL includes three lens units having negative refractive powers and two lens units having positive refractive powers. Specifically, the rear unit RL includes a fourth lens unit B4 having a negative refractive power, a fifth lens unit B5 having a positive refractive power, a sixth lens unit B6 having a negative refractive power, a seventh lens unit B7 having a positive refractive power, and an eighth lens unit B8 having a negative refractive power. During zooming, the first lens unit B1 moves to the object side from the wide-angle end to the telephoto end, the second lens unit B2 moves on an optical axis to the image side, and then moves to the object side, from the wide-angle end to the telephoto end, and the rear unit RL also properly moves.

In the rear unit RL, a lens unit having a negative refractive power closest to a diaphragm corresponds to the fourth lens unit B4, and image stabilization is performed by moving the fourth lens unit B4 in a direction including a component of a direction orthogonal to the optical axis.

A lens unit having the strongest negative refractive power in the rear unit RL corresponds to the sixth lens unit B6, and focusing is performed by moving the sixth lens unit B6 along the optical axis. The diaphragm is disposed between the second lens unit B2 and the third lens unit B3.

Example 2

Figure 3:
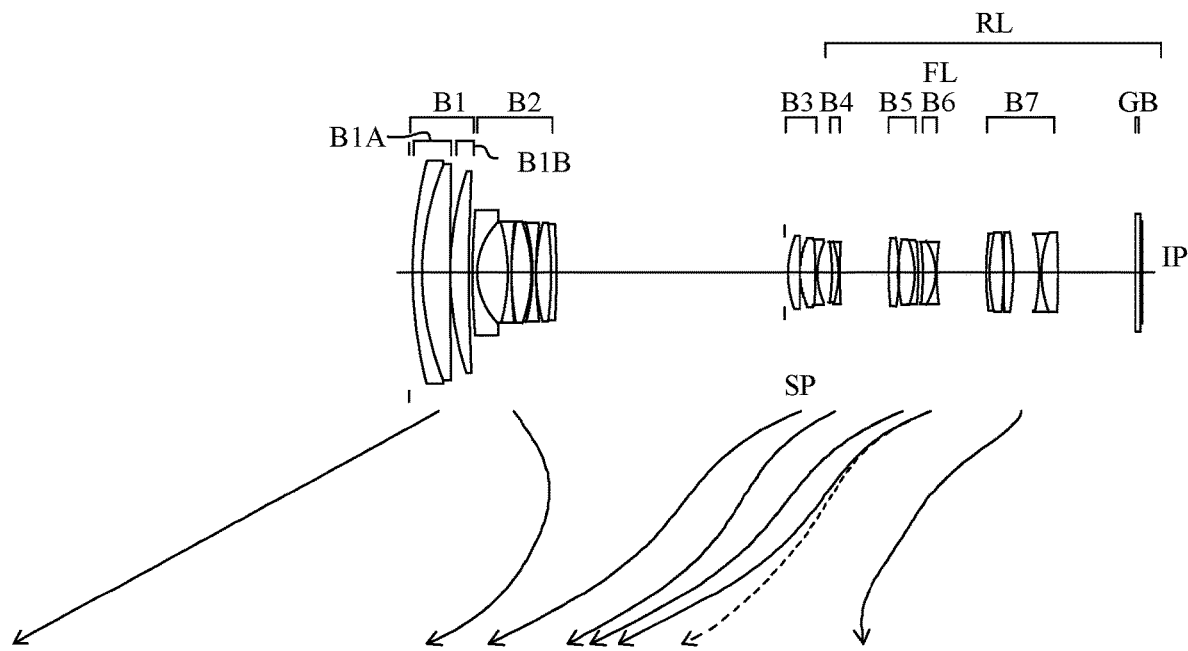
FIG. 3 is a sectional view of lenses according to an Example 2 of the present disclosure.

FIG. 3 illustrates a sectional view of lenses at a wide-angle end, i.e., a short focal length end, and at a telephoto end, i.e., a long focal length end, of a zoom lens according to an Example 2 of the present disclosure.

Figure 4A:
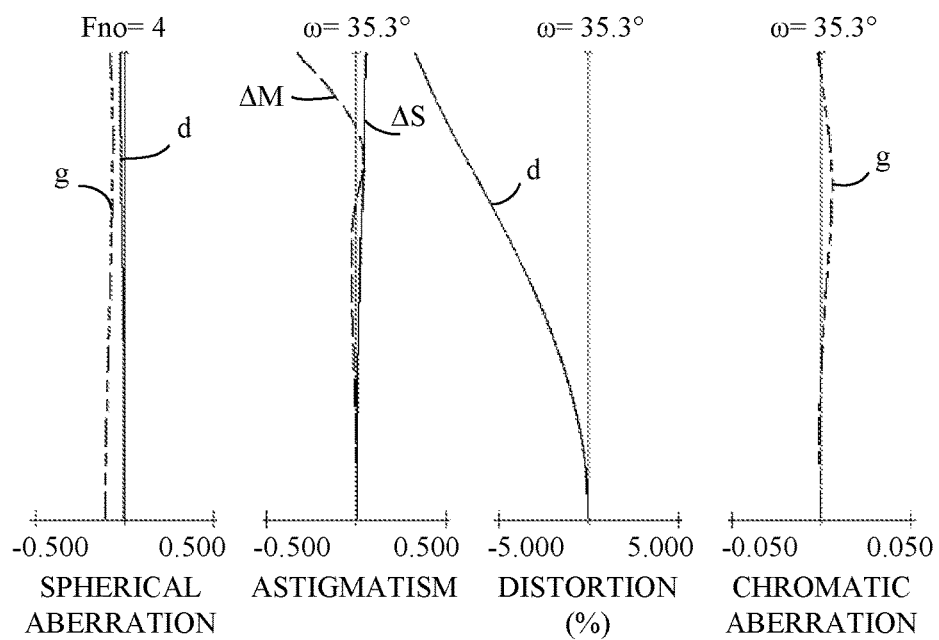
FIGS. 4A to 4C are aberration diagrams at a wide-angle end (A), at middle (B), and at a telephoto end (C) when the zoom lens focuses on an infinite distant object according to the Example 2 of the present disclosure.
Figure 4B:
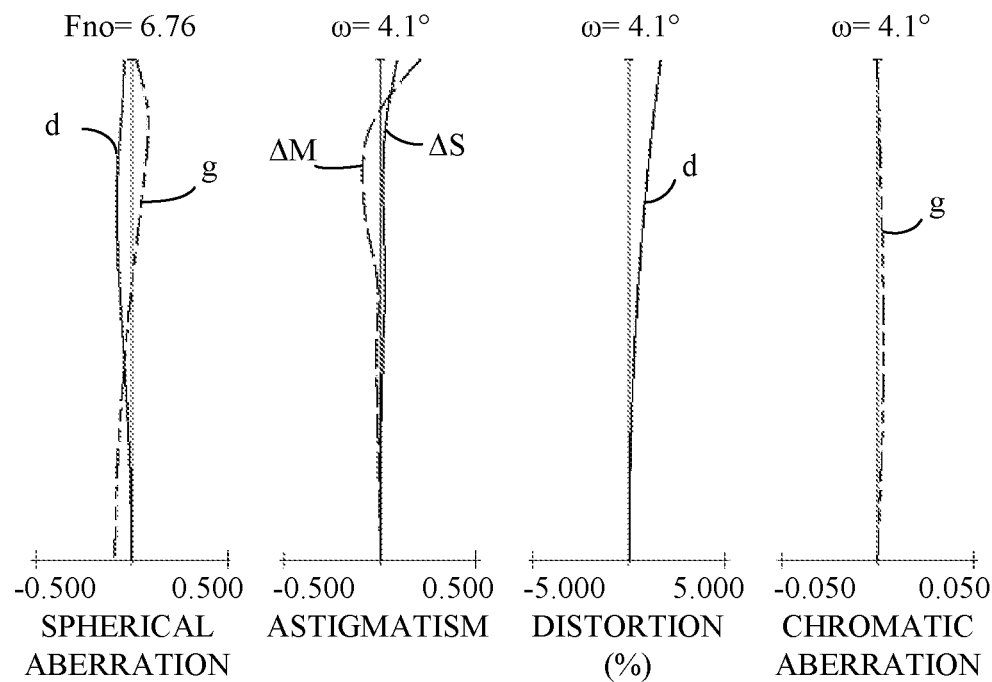
Figure 4C:
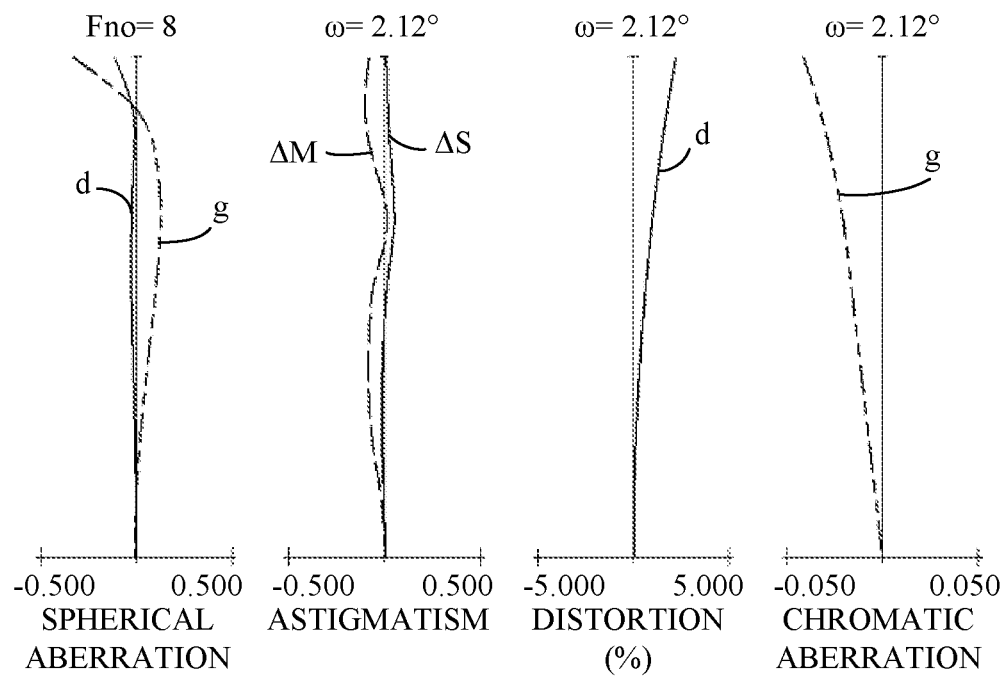

FIGS. 4A to 4C are aberration diagrams at the wide-angle end, middle zoom position, and telephoto end when the zoom lens of the Example 2 focuses on an infinite distant object, respectively.

The zoom lens of the Example 2 has a high zoom ratio of about 19 times. The zoom lens of the Example 2 includes, in order from an object side to an image side, a first lens unit B1 having a positive refractive power, a second lens unit B2 having a negative refractive power, a third lens unit B3 having a positive refractive power, and a rear unit RL following on the image side. The rear unit RL includes two lens units having negative refractive powers and two lens units having positive refractive powers. Specifically, the rear unit RL includes a fourth lens unit B4 having a negative refractive power, a fifth lens unit B5 having a positive refractive power, a sixth lens unit B6 having a negative refractive power, and a seventh lens unit B7 having a positive refractive power. During zooming, the first lens unit B1 moves to the object side from the wide-angle end to the telephoto end, the second lens unit B2 moves on an optical axis to the image side, and then moves to the object side, from the wide-angle end to the telephoto end, and the rear unit RL also properly moves.

In the rear unit RL, a lens unit having a negative refractive power closest to a diaphragm corresponds to the fourth lens unit B4, and image stabilization is performed by moving the fourth lens unit B4 in a direction including a component of a direction orthogonal to the optical axis.

A lens unit having the strongest negative refractive power in the rear unit RL corresponds to the sixth lens unit B6, and focusing is performed by moving the sixth lens unit B6 along the optical axis. The diaphragm is disposed between the second lens unit B2 and the third lens unit B3.

Example 3

Figure 5:
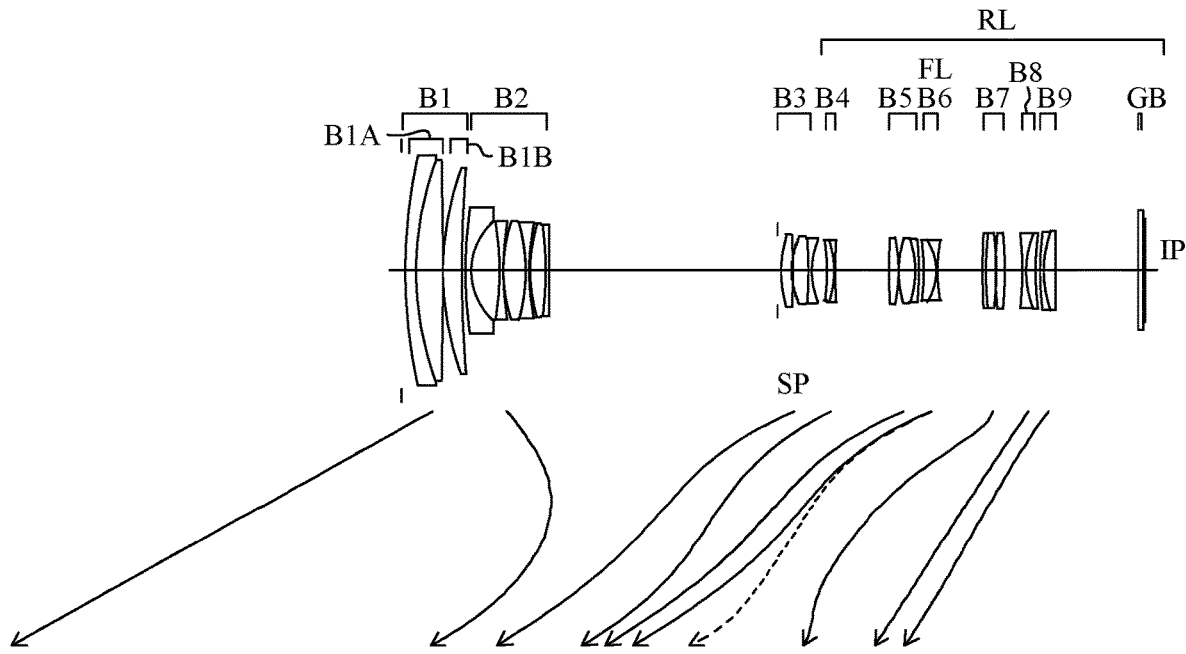
FIG. 5 is a sectional view of lenses according to an Example 3 of the present disclosure.

FIG. 5 illustrates a sectional view of lenses at a wide-angle end, i.e., a short focal length end, and at a telephoto end, i.e., a long focal length end, of a zoom lens according to an Example 3 of the present disclosure.

Figure 6A:
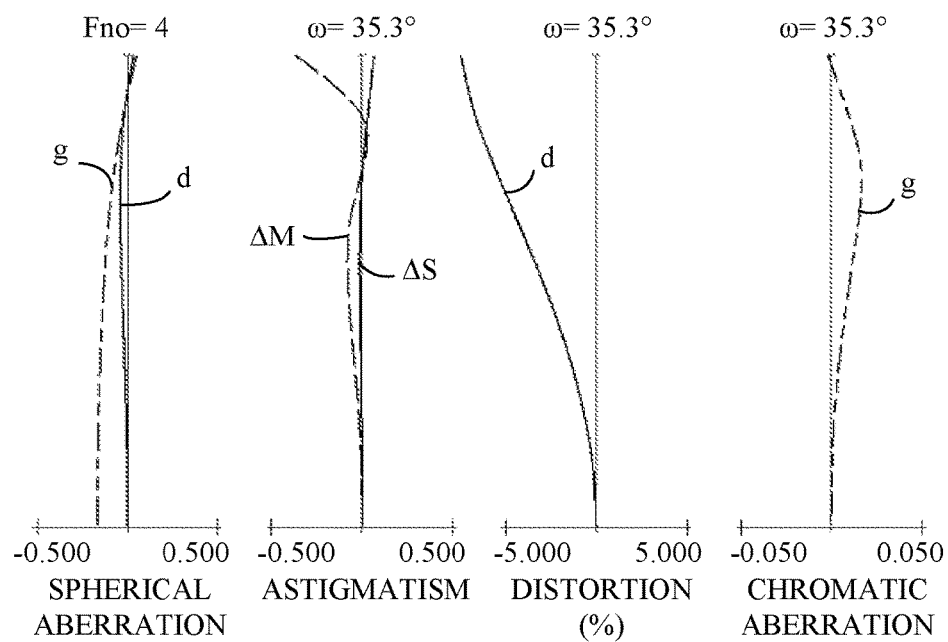
FIGS. 6A to 6C are aberration diagrams at a wide-angle end (A), at middle (B), and at a telephoto end (C) when the zoom lens focuses on an infinite distant object according to the Example 3 of the present disclosure.
Figure 6B:
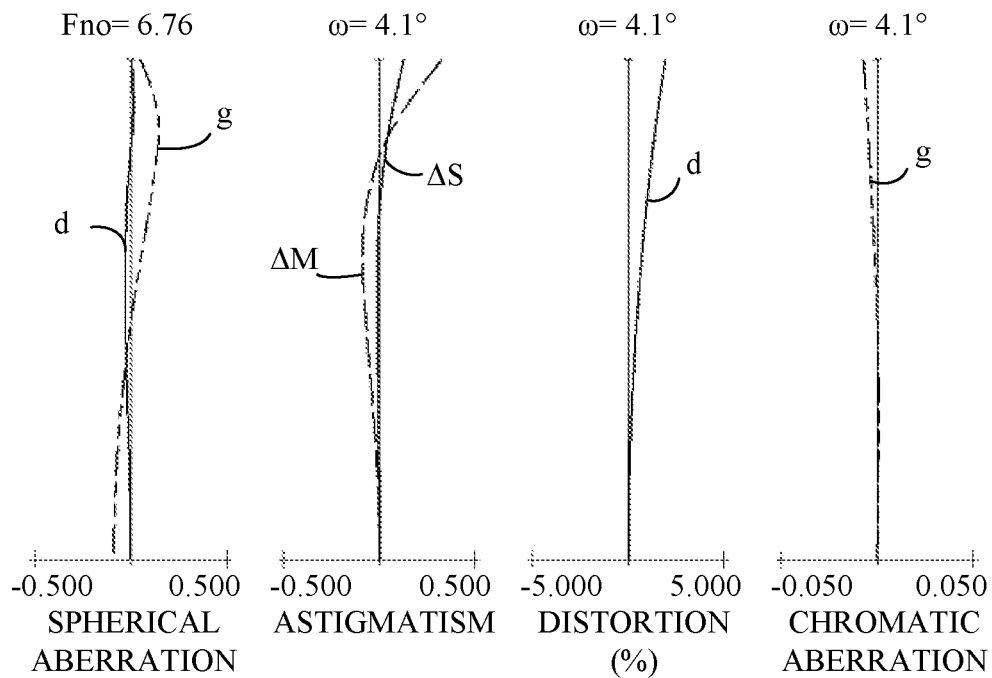
Figure 6C:
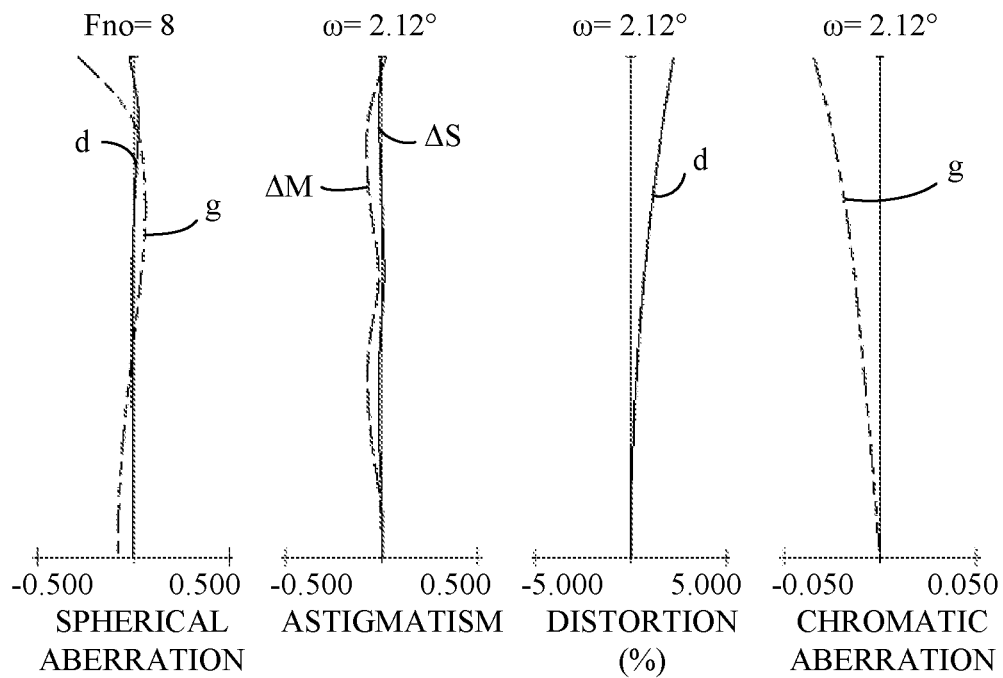

FIGS. 6A to 6C are aberration diagrams at the wide-angle end, middle zoom position, and telephoto end when the zoom lens of the Example 3 focuses on an infinite distant object, respectively.

The zoom lens of the Example 3 has a high zoom ratio of about 19 times. The zoom lens of the Example 3 includes a first lens unit B1 having a positive refractive power, a second lens unit B2 having a negative refractive power, a third lens unit B3 having a positive refractive power, and a rear unit RL following on the image side. The rear unit RL includes three lens units having negative refractive powers and three lens units having positive refractive powers. Specifically, the rear unit RL includes a fourth lens unit B4 having a negative refractive power, a fifth lens unit B5 having a positive refractive power, a sixth lens unit B6 having a negative refractive power, a seventh lens unit B7 having a positive refractive power, an eighth lens unit B8 having a negative refractive power, and a nineth lens unit B9 having a positive refractive power. During zooming, the first lens unit B1 moves to the object side from the wide-angle end to the telephoto end, the second lens unit B2 moves on an optical axis to the image side, and then moves to the object side, from the wide-angle end to the telephoto end, and the rear unit RL also properly moves.

In the rear unit RL, a lens unit having a negative refractive power closest to a diaphragm corresponds to the fourth lens unit B4, and image stabilization is performed by moving the fourth lens unit B4 in a direction including a component of a direction orthogonal to the optical axis.

A lens unit having the strongest negative refractive power in the rear unit RL corresponds to the sixth lens unit B6, and focusing is performed by moving the sixth lens unit B6 along the optical axis. The diaphragm is disposed between the second lens unit B2 and the third lens unit B3.

Example 4

Figure 7:
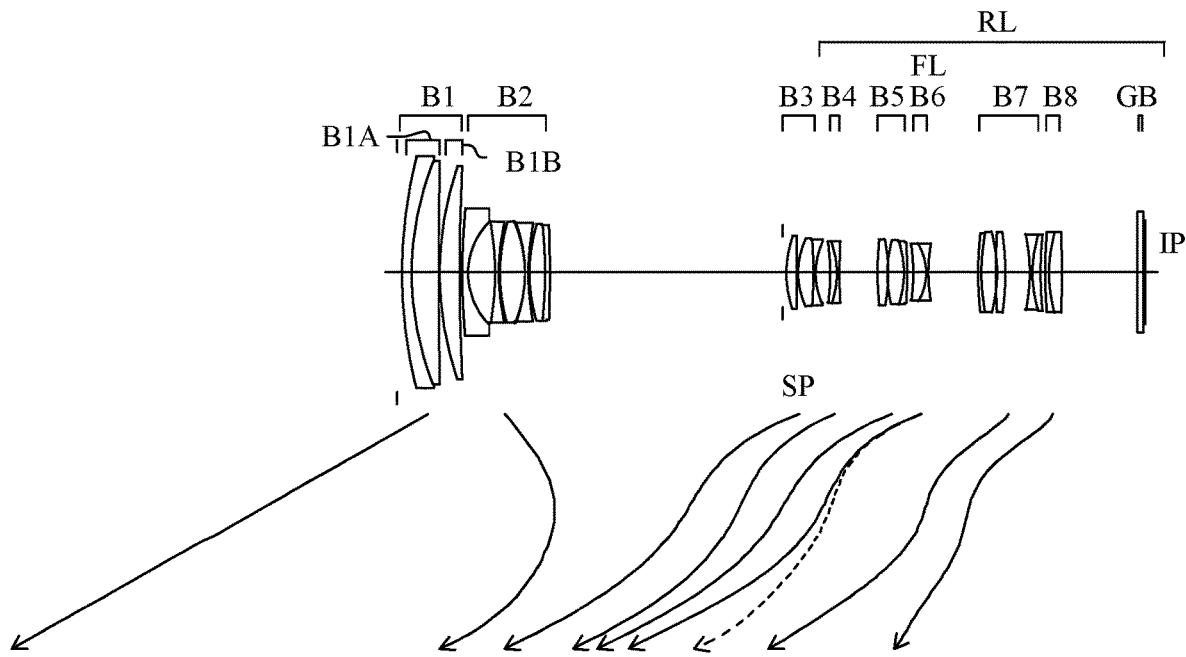
FIG. 7 is a sectional view of lenses according to an Example 4 of the present disclosure.

FIG. 7 illustrates a sectional view of lenses at a wide-angle end, i.e., a short focal length end, and at a telephoto end, i.e., a long focal length end, of a zoom lens according to an Example 4 of the present disclosure.

Figure 8A:
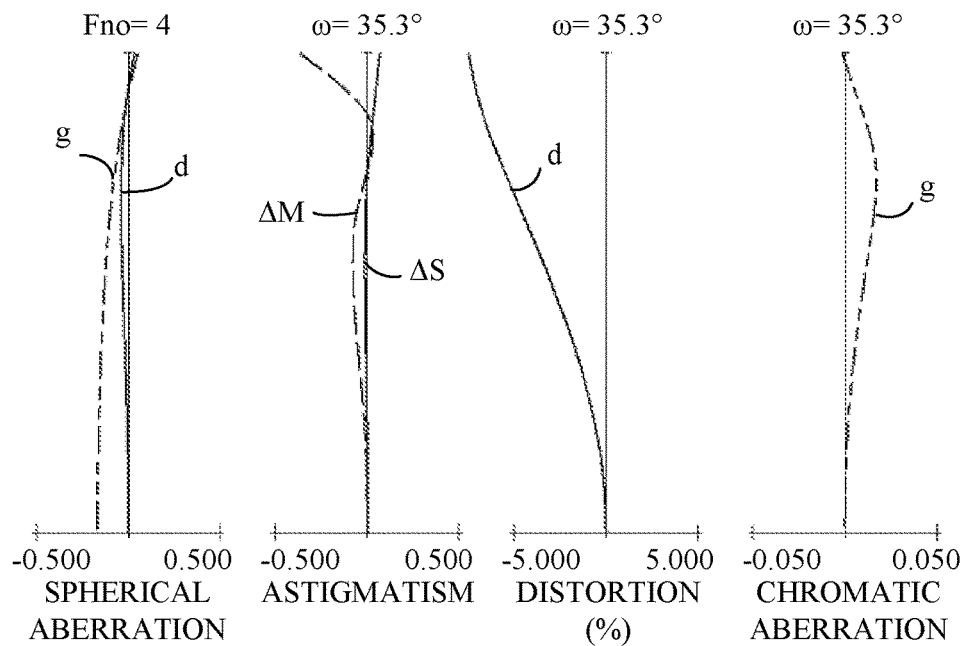
FIGS. 8A to 8C are aberration diagrams at a wide-angle end (A), at middle (B), and at a telephoto end (C) when the zoom lens focuses on an infinite distant object according to the Example 4 of the present disclosure.
Figure 8B:
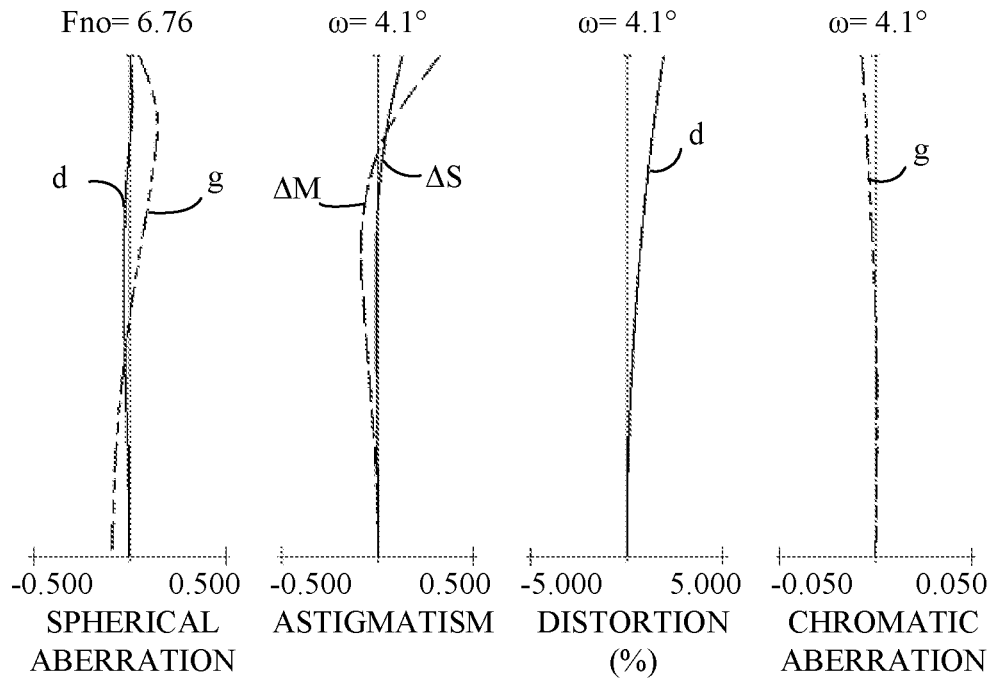
Figure 8C:
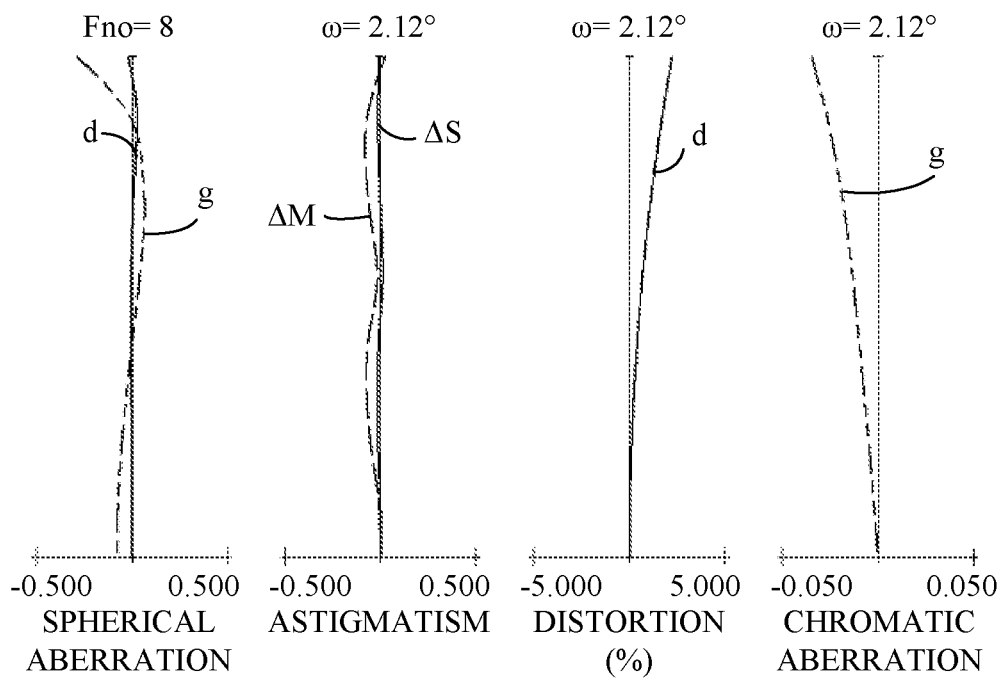

FIGS. 8A to 8C are aberration diagrams at the wide-angle end, middle zoom position, and telephoto end when the zoom lens of the Example 4 focuses on an infinite distant object, respectively.

The zoom lens of the Example 4 has a high zoom ratio of about 19 times. The zoom lens of the Example 4 includes a first lens unit B1 having a positive refractive power, a second lens unit B2 having a negative refractive power, a third lens unit B3 having a positive refractive power, and a rear unit RL following on the image side. The rear unit RL includes two lens units having negative refractive powers and three lens units having positive refractive powers. Specifically, the rear unit RL includes a fourth lens unit B4 having a negative refractive power, a fifth lens unit B5 having a positive refractive power, a sixth lens unit B6 having a negative refractive power, a seventh lens unit B7 having a positive refractive power, and an eighth lens unit B8 having a positive refractive power. During zooming, the first lens unit B1 moves to the object side from the wide-angle end to the telephoto end, the second lens unit B2 moves on an optical axis to the image side, and then moves to the object side, from the wide-angle end to the telephoto end, and the rear unit RL also properly moves.

In the rear unit RL, a lens unit having a negative refractive power closest to a diaphragm corresponds to the fourth lens unit B4, and image stabilization is performed by moving the fourth lens unit B4 in a direction including a component of a direction orthogonal to the optical axis.

A lens unit having the strongest negative refractive power in the rear unit RL corresponds to the sixth lens unit B6, and focusing is performed by moving the sixth lens unit B6 along the optical axis. The diaphragm is disposed between the second lens unit B2 and the third lens unit B3.

Example 5

Figure 9:
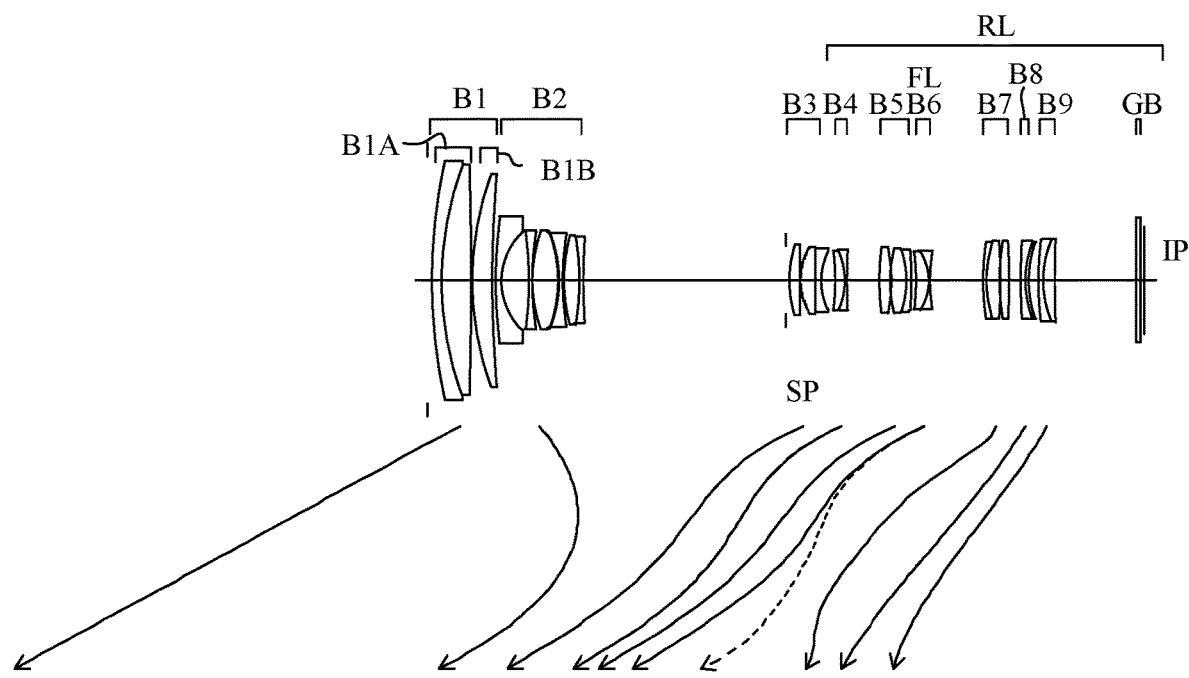
FIG. 9 is a sectional view of lenses according to an Example 5 of the present disclosure.

FIG. 9 illustrates a sectional view of lenses at a wide-angle end, i.e., a short focal length end, and at a telephoto end, i.e., a long focal length end, of a zoom lens according to an Example 5 of the present disclosure.

Figure 10A:
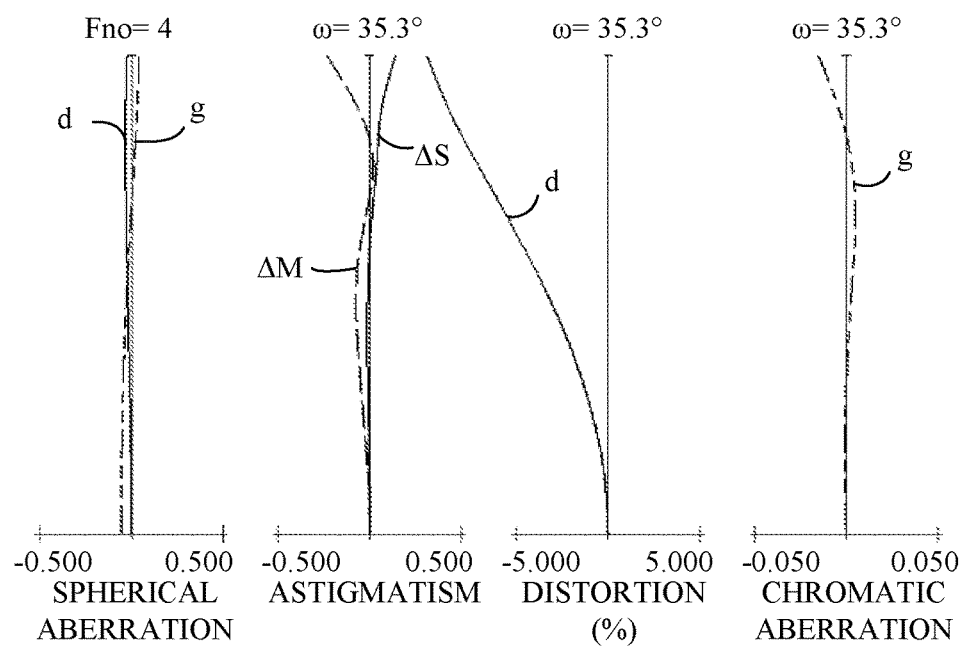
FIGS. 10A to 10C are aberration diagrams at a wide-angle end (A), at middle (B), and at a telephoto end (C) when the zoom lens focuses on an infinite distant object according to the Example 5 of the present disclosure.
Figure 10B:
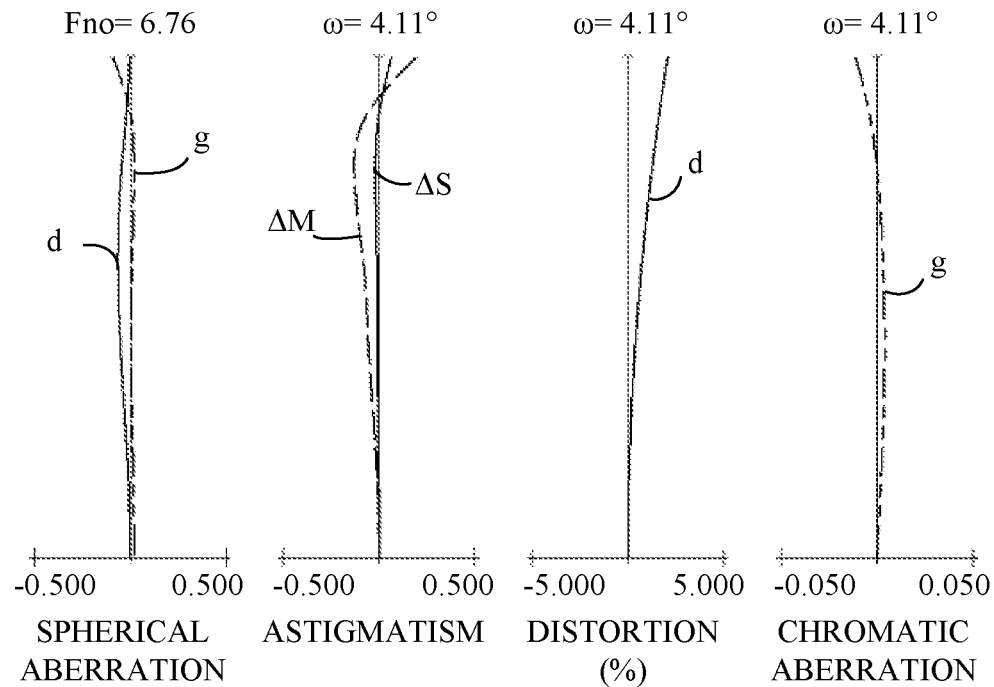
Figure 10C:
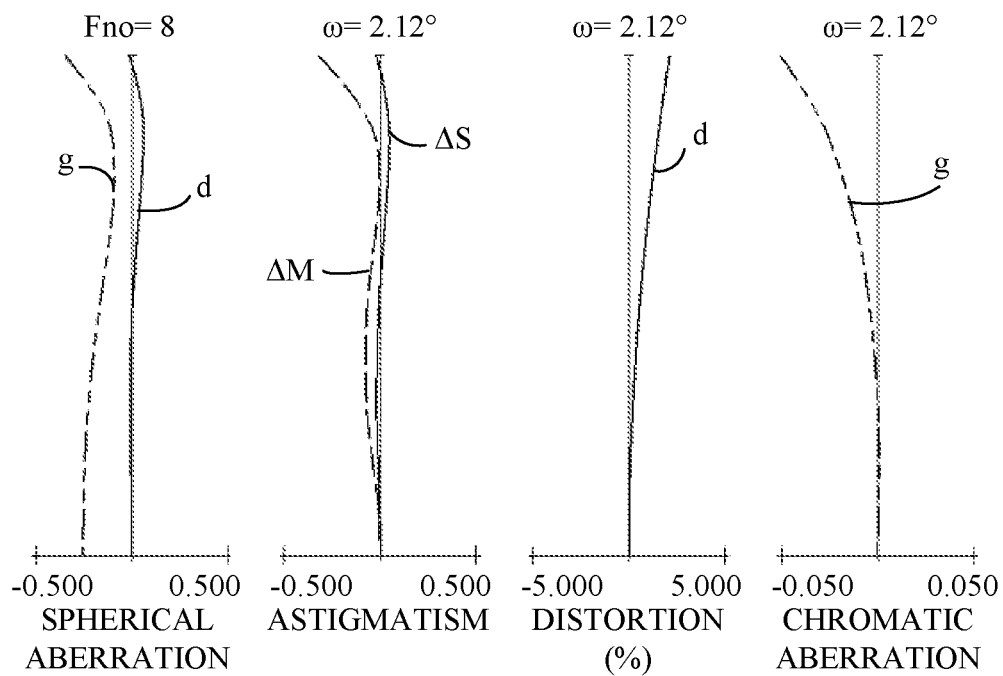

FIGS. 10A to 10C are aberration diagrams at the wide-angle end, middle zoom position, and telephoto end when the zoom lens of the Example 5 focuses on an infinite distant object, respectively.

The zoom lens of the Example 5 has a high zoom ratio of about 19 times. The zoom lens of the Example 5 includes a first lens unit B1 having a positive refractive power, a second lens unit B2 having a negative refractive power, a third lens unit B3 having a positive refractive power, and a rear unit RL following on the image side. The rear unit RL includes three lens units having negative refractive powers and three lens units having positive refractive powers. Specifically, the rear unit RL includes a fourth lens unit B4 having a negative refractive power, a fifth lens unit B5 having a positive refractive power, a sixth lens unit B6 having a negative refractive power, a seventh lens unit B7 having a positive refractive power, an eighth lens unit B8 having a negative refractive power, and a nineth lens unit B9 having a positive refractive power. During zooming, the first lens unit B1 moves to the object side from the wide-angle end to the telephoto end, the second lens unit B2 moves on an optical axis to the image side, and then moves to the object side, from the wide-angle end to the telephoto end, and the rear unit RL also properly moves.

In the rear unit RL, a lens unit having a negative refractive power closest to a diaphragm corresponds to the fourth lens unit B4, and image stabilization is performed by moving the fourth lens unit B4 in a direction including a component of a direction orthogonal to the optical axis.

A lens unit having the strongest negative refractive power in the rear unit RL corresponds to the sixth lens unit B6, and focusing is performed by moving the sixth lens unit B6 along the optical axis. The diaphragm is disposed between the second lens unit B2 and the third lens unit B3.

Figure 11:
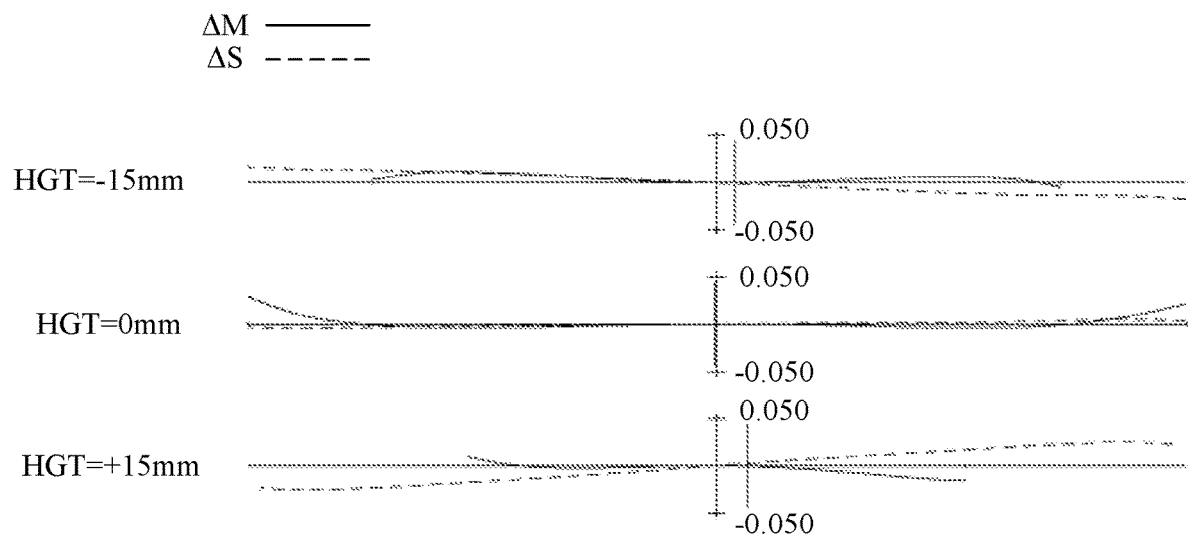
FIG. 11 is a lateral aberration diagram at the telephoto end when the zoom lens performs image stabilization by 0.4 degrees, according to the Example 1 of the present disclosure.

FIG. 11 illustrates lateral aberration diagrams in a state where the fourth lens unit B4 of the Example 1 of the present disclosure is made parallelly eccentric and an angle of the optical axis on the object surface is changed by about 0.4 degrees so that image stabilization is performed by the fourth lens unit B4. In the other examples, image stabilization can be performed by the fourth lens unit B4.

The zoom lens of each example is an image pickup lens system used for an image pickup apparatus such as a video camera, a digital still camera, a silver-halide film camera, and a TV camera.

The zoom lens of each example can also be used as a projection optical system for a projection apparatus.

In each sectional view of lenses, a left side is the object side, i.e., a front side, and a right side is the image side, i.e., a rear side. In each sectional view of lenses, when i is an order of a lens unit counted from the object side, Bi represents an i-th lens unit. In each sectional view of lenses, partial units included in the first lens unit B1 are a first partial unit B1A and a second partial unit B1B, in order from the object side.

In each sectional view of lenses, FL represents a focus lens unit, and a dotted arrow indicates an extension direction from an infinite side to a close side. SP represents the diaphragm. GB represents an optical block corresponding to an optical filter, a face plate, a low-pass filter, an infrared cut filter, and the like. IP represents an image plane. The image plane IP corresponds to an image pickup plane of an image sensor, which is a photoelectric conversion element, such as a CCD sensor and a CMOS sensor when the zoom lens is used as an image pickup optical system of a video camera or a digital camera. The image plane IP corresponds to a film surface when the zoom lens is used as an image pickup optical system of a silver-halide film camera.

A solid arrow represents a moving trajectory of each lens unit during zooming from the wide-angle end to the telephoto end. Each distance between adjacent lens units changes during zooming.

In aberration diagrams of each example, Fno represents a F number and ω represents a half angle of view (°). In each spherical aberration diagram, a solid line represents a d line of a wavelength of 587.6 nm and an alternate long and short dash line represents a g line of a wavelength of 435.8 nm. In each astigmatism diagram, a solid line represents a sagittal image plane ΔS for the d line, and a dotted line represents a meridional image plane ΔM for the d line. Each distortion diagram is for the d line. Each lateral chromatic aberration diagram is for the g-line.

In each example, the wide-angle end and telephoto end refer to zoom positions when the lens unit for zooming is located at both ends of a mechanically movable range on the optical axis.

The lateral aberration diagrams of FIG. 11 describe aberration variations in a state where image stabilization is performed, for a center of an image height and upper and lower image heights. Each solid line represents lateral chromatic aberration ΔM of meridional for the d line, and each dotted line represents lateral aberration ΔS of sagittal. Numerical values indicated as HGT in FIG. 11 correspond to off-axis image heights, +15 mm corresponds to the upper side of the sectional view, and −15 mm corresponds to the lower side of the sectional view.

Image Pickup Apparatus

Figure 12:
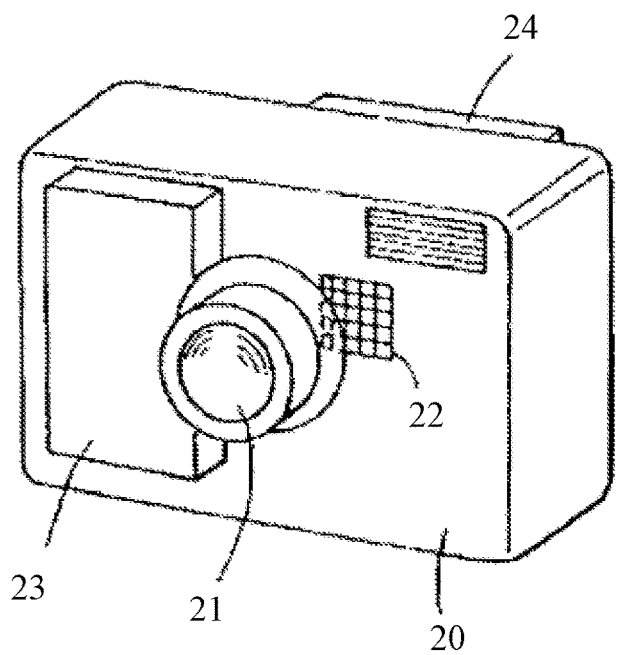
FIG. 12 is a schematic diagram of a main part of an image pickup apparatus according to the present disclosure.

Next, a description will be given of an embodiment of a digital camera as an image pickup apparatus using the zoom lens according to the embodiment of the present disclosure as the image pickup optical system with reference to FIG. 12. FIG. 12 is a schematic view illustrating a main part of the digital still camera as the image pickup apparatus having the zoom lens according to the embodiment of present disclosure.

In FIG. 12, a reference numeral 20 denotes a digital camera main body, and a reference numeral 21 denotes an image pickup optical system including the zoom lens of any of the above Examples. A reference numeral 22 denotes an image sensor as a photoelectric conversion element, such as a CCD configured to receive light of an object image from the image pickup optical system 21. A reference numeral 23 denotes a memory configured to store the object image received from the image sensor 22. A reference numeral 24 denotes a finder for observing the object image displayed on a display element (not illustrated).

The display element includes a liquid crystal panel, etc., and is configured to display the object image formed on the image sensor 22. When the zoom lens according to the embodiment of the present disclosure is applied to the image pickup apparatus such as the digital camera in this way, it is possible to provide a small-sized image pickup apparatus having high optical performance.

Following Numerical Examples 1 to 5 describes specific numerical data corresponding to the Examples 1 to 5. In each numerical example, i represents a surface number counted from the object side. fi represents a focal length of an i-th lens unit. ri represents a curvature radius of an i-th optical surface. di represents an on-axis distance between the i-th surface and a (i+1)-th surface. ndi and vdi respectively represent a refractive index and an Abbe number of material of the i-th optical element for the d line. Two surfaces on the most image side correspond to a glass block G. An Abbe number vd of certain material is represented by $$vd=(Nd-1)/(NF-NC)$$

where Nd, NF, and NC represent refractive indexes for the d line (587.6 nm), F line (486.1 nm), and C line (656.3 nm) of Fraunhofer lines, respectively, In each numerical example, d, focal length (mm), F number, and half angle of view (°) are all values when the optical system of each example focuses on an infinite distant object. "Back focus BF" is a distance on the optical axis from a lens last surface, which is a lens surface on the most image side, to a paraxial image plane, expressed as an air conversion length. "Overall lens length" is a sum of a distance on the optical axis from a front surface of the zoom lens, which is a lens surface on the most object side, to the last surface, and the back focus. Wide-angle indicates the wide-angle end, middle indicates the middle zoom position, and telephoto indicates the telephoto end.

When an optical surface is an aspherical surface, a * sign is attached to the right side of the surface number. An aspherical surface shape is expressed by the following expression:

$$x=(h^2/R)/[1+\{1-(1+k)(h/R)^2\}^{1/2}]+A4\times h^4+A6\times h^6+A8\times h^8+A10\times h^{10}+A12\times h^{12}$$

where X represents an amount of displacement from a surface vertex in the optical axis direction, h represents a height from the optical axis in the direction orthogonal to the optical axis, R represents a paraxial curvature radius, k represents a conic constant, A4, A6, A8, A10, and A12 represent aspherical surface coefficients of respective orders. "e±XX" in each aspherical surface coefficient represents "×10±$^{XX}$".

Numerical Example 1

Unit: mm

SURFACE DATA

| Surface number | r | d | nd | vd |
|---|---|---|---|---|
| 1 | ∞ | 1.80 | | |
| 2 | 216.778 | 4.00 | 1.80610 | 33.3 |
| 3 | 132.288 | 11.30 | 1.49700 | 81.5 |
| 4 | −3138.961 | 0.20 | | |
| 5 | 131.079 | 7.91 | 1.49700 | 81.5 |
| 6 | 559.185 | (variable) | | |
| 7 | 238.370 | 2.40 | 1.89190 | 37.1 |
| 8 | 30.381 | 10.55 | | |
| 9 | −155.284 | 2.00 | 1.89190 | 37.1 |
| 10 | 82.883 | 0.20 | | |
| 11 | 68.878 | 9.65 | 1.84666 | 23.8 |
| 12 | −58.288 | 0.20 | | |
| 13 | −65.948 | 2.00 | 1.89190 | 37.1 |
| 14 | 99.320 | 0.20 | | |
| 15 | 63.239 | 6.01 | 1.72825 | 28.5 |
| 16 | −237.949 | 2.04 | 1.90366 | 31.3 |
| 17 | 445.526 | (variable) | | |
| 18 (diaphragm) | ∞ | 1.50 | | |
| 19 | 45.567 | 5.03 | 1.78472 | 25.7 |
| 20 | −324.029 | 0.20 | | |
| 21 | 32.837 | 6.32 | 1.49700 | 81.5 |
| 22 | −122.651 | 1.45 | 1.85478 | 24.8 |
| 23 | 32.292 | (variable) | | |
| 24 | −97.276 | 4.06 | 1.60738 | 56.8 |
| 25 | −28.119 | 1.35 | 1.59522 | 67.7 |
| 26 | 307.771 | (variable) | | |
| 27 | 143.558 | 4.16 | 1.72000 | 46.0 |
| 28 | −62.468 | 0.20 | | |
| 29 | 53.287 | 6.14 | 1.59522 | 67.7 |
| 30 | −44.734 | 1.50 | 1.90366 | 31.3 |
| 31 | −337.425 | (variable) | | |
| 32 | −88.970 | 5.20 | 1.84666 | 23.8 |
| 33 | −24.825 | 1.30 | 1.80610 | 33.3 |
| 34 | 85.062 | (variable) | | |
| 35 | 146.359 | 1.60 | 1.80518 | 25.4 |
| 36 | 82.298 | 5.34 | 1.53172 | 48.8 |
| 37 | −86.332 | 0.31 | | |
| 38 | 256.759 | 3.50 | 1.51742 | 52.2 |
| 39 | −110.200 | (variable) | | |
| 40 | −63.946 | 1.60 | 1.88202 | 37.2 |
| 41 | 50.834 | 7.21 | 1.74077 | 27.8 |
| 42 | −352.595 | (variable) | | |
| 43 | ∞ | 2.00 | 1.51633 | 64.1 |
| 44 | ∞ | (variable) | | |
| Image Plane | ∞ | | | |

VARIOUS DATA
Zoom Ratio 19.18

| | Wide-Angle | Middle | Telephoto |
|---|---|---|---|
| Focal Length: | 30.50 | 300.00 | 585.00 |
| Fno: | 4.00 | 6.76 | 8.00 |
| Half Angle of View (°): | 35.35 | 4.12 | 2.12 |
| Image Height: | 21.64 | 21.64 | 21.64 |
| Overall Lens Length: | 309.33 | 427.20 | 489.09 |
| BF: | 29.33 | 69.05 | 102.45 |
| d 6 | 1.20 | 130.62 | 149.77 |
| d17 | 97.47 | 12.22 | 2.21 |
| d23 | 5.35 | 14.21 | 19.89 |
| d26 | 16.58 | 7.72 | 2.03 |
| d31 | 2.69 | 7.01 | 2.69 |
| d34 | 24.92 | 43.53 | 68.62 |
| d39 | 13.37 | 24.43 | 23.01 |
| d42 | 26.88 | 66.60 | 100.00 |
| d44 | 1.13 | 1.13 | 1.13 |

ZOOM LENS UNIT DATA

| Lens Unit | Starting Surface | Focal Length |
|---|---|---|
| 1 | 1 | 225.80 |
| 2 | 7 | −33.60 |
| 3 | 18 | 91.96 |
| 4 | 24 | −128.56 |
| 5 | 27 | 42.29 |
| 6 | 32 | −56.75 |
| 7 | 35 | 67.68 |
| 8 | 40 | −69.76 |
| 9 | 43 | ∞ |

Numerical Example 2

Unit: mm

SURFACE DATA

| Surface number | r | d | nd | vd |
|---|---|---|---|---|
| 1 | ∞ | 1.80 | | |
| 2 | 188.901 | 4.00 | 1.80610 | 33.3 |
| 3 | 120.086 | 11.40 | 1.49700 | 81.5 |
| 4 | 1867.591 | 0.20 | | |
| 5 | 134.277 | 8.04 | 1.49700 | 81.5 |
| 6 | 825.900 | (variable) | | |
| 7 | 294.228 | 2.40 | 1.88300 | 40.8 |
| 8 | 30.173 | 12.00 | | |
| 9 | −76.540 | 2.00 | 1.88300 | 40.8 |
| 10 | 176.969 | 0.20 | | |
| 11 | 114.152 | 8.00 | 1.84666 | 23.8 |
| 12 | −61.516 | 0.20 | | |
| 13 | −77.693 | 2.00 | 1.89190 | 37.1 |
| 14 | 158.995 | 0.20 | | |
| 15 | 77.336 | 6.01 | 1.67270 | 32.1 |
| 16 | −166.138 | 2.00 | 1.89190 | 37.1 |
| 17 | −357.013 | (variable) | | |
| 18 (diaphragm) | ∞ | 1.50 | | |
| 19 | 42.383 | 4.79 | 1.85478 | 24.8 |
| 20 | 5689.634 | 0.20 | | |
| 21* | 35.365 | 5.68 | 1.49700 | 81.5 |
| 22 | −218.398 | 1.45 | 1.84666 | 23.8 |
| 23 | 30.749 | (variable) | | |
| 24 | −91.776 | 2.81 | 1.65844 | 50.9 |
| 25 | −40.443 | 1.30 | 1.59522 | 67.7 |
| 26 | 349.809 | (variable) | | |
| 27 | 118.743 | 3.98 | 1.69100 | 54.8 |
| 28 | −75.539 | 0.20 | | |
| 29 | 58.391 | 6.32 | 1.59522 | 67.7 |
| 30 | −40.419 | 1.50 | 1.90366 | 31.3 |
| 31 | −151.366 | (variable) | | |
| 32 | −109.232 | 5.20 | 1.90366 | 31.3 |
| 33 | −24.664 | 1.30 | 1.85150 | 40.8 |
| 34 | 87.557 | (variable) | | |
| 35 | 119.777 | 1.60 | 1.84666 | 23.8 |
| 36 | 74.154 | 5.70 | 1.53172 | 48.8 |
| 37 | −143.703 | 0.20 | | |
| 38 | 452.277 | 3.50 | 1.51823 | 58.9 |
| 39 | −91.835 | 10.96 | | |
| 40 | −73.186 | 1.60 | 1.85150 | 40.8 |
| 41 | 45.093 | 6.28 | 1.74077 | 27.8 |
| 42 | −352.595 | (variable) | | |
| 43 | ∞ | 2.00 | 1.51633 | 64.1 |
| 44 | ∞ | (variable) | | |
| Image Plane | ∞ | | | |

-continued

Unit: mm

ASPHERICAL SURFACE DATA

21st surface

K = 0.00000e+000 A4 = −5.87534e−007 A6 = −3.33478e−010
A8 = −1.17968e−012

VARIOUS DATA
Zoom Ratio 19.18

|  | Wide-Angle | Middle | Telephoto |
|---|---|---|---|
| Focal Length: | 30.50 | 302.00 | 585.00 |
| Fno: | 4.00 | 6.76 | 8.00 |
| Half Angle of View (°): | 35.35 | 4.10 | 2.12 |
| Image Height: | 21.64 | 21.64 | 21.64 |
| Overall Lens Length: | 309.33 | 431.61 | 489.33 |
| BF: | 35.46 | 94.70 | 102.45 |
| d 6 | 1.20 | 126.39 | 144.72 |
| d17 | 97.23 | 17.29 | 2.00 |
| d23 | 5.76 | 19.65 | 24.16 |
| d26 | 20.41 | 6.52 | 2.00 |
| d31 | 2.22 | 4.14 | 2.36 |
| d34 | 20.54 | 36.39 | 85.10 |
| d42 | 33.01 | 92.26 | 100.00 |
| d44 | 1.13 | 1.13 | 1.13 |

ZOOM LENS UNIT DATA

| Lens Unit | Starting Surface | Focal Length |
|---|---|---|
| 1 | 1 | 222.09 |
| 2 | 7 | −36.40 |
| 3 | 18 | 98.44 |
| 4 | 24 | −136.57 |
| 5 | 27 | 42.90 |
| 6 | 32 | −62.12 |
| 7 | 35 | 312.95 |
| 8 | 43 | ∞ |

Numerical Example 3

Unit: mm

SURFACE DATA

| Surface number | r | d | nd | vd |
|---|---|---|---|---|
| 1 | ∞ | 1.80 |  |  |
| 2 | 223.463 | 4.00 | 1.80610 | 33.3 |
| 3 | 133.187 | 11.47 | 1.49700 | 81.5 |
| 4 | −1959.031 | 0.20 |  |  |
| 5 | 126.710 | 8.05 | 1.49700 | 81.5 |
| 6 | 530.754 | (variable) |  |  |
| 7 | 189.567 | 2.40 | 1.88300 | 40.8 |
| 8 | 28.256 | 11.35 |  |  |
| 9 | −124.138 | 2.00 | 1.88300 | 40.8 |
| 10 | 122.879 | 0.20 |  |  |
| 11 | 64.284 | 8.71 | 1.84666 | 23.8 |
| 12 | −74.483 | 0.20 |  |  |
| 13 | −79.390 | 2.00 | 1.89190 | 37.1 |
| 14 | 98.962 | 0.20 |  |  |
| 15 | 70.205 | 6.01 | 1.67270 | 32.1 |
| 16 | −150.639 | 2.00 | 1.89190 | 37.1 |
| 17 | 902.370 | (variable) |  |  |
| 18 (diaphragm) | ∞ | 1.50 |  |  |
| 19 | 52.534 | 4.42 | 1.85478 | 24.8 |
| 20 | −373.094 | 0.20 |  |  |
| 21* | 34.325 | 6.56 | 1.49700 | 81.5 |
| 22 | −183.232 | 1.82 | 1.84666 | 23.8 |
| 23 | 34.368 | (variable) |  |  |
| 24 | −93.156 | 2.84 | 1.65844 | 50.9 |
| 25 | −40.085 | 1.30 | 1.59522 | 67.7 |
| 26 | 297.349 | (variable) |  |  |
| 27 | 216.877 | 3.68 | 1.69100 | 54.8 |
| 28 | −67.658 | 0.20 |  |  |
| 29 | 47.104 | 6.62 | 1.59522 | 67.7 |
| 30 | −42.486 | 1.50 | 1.90366 | 31.3 |
| 31 | −153.552 | (variable) |  |  |
| 32 | −106.102 | 5.07 | 1.90366 | 31.3 |
| 33 | −24.067 | 1.30 | 1.85150 | 40.8 |
| 34 | 73.203 | (variable) |  |  |
| 35 | 327.023 | 1.60 | 1.84666 | 23.8 |
| 36 | 150.439 | 3.57 | 1.53172 | 48.8 |
| 37 | −119.144 | 0.20 |  |  |
| 38 | 148.328 | 3.50 | 1.51823 | 58.9 |
| 39 | −169.036 | (variable) |  |  |
| 40 | −145.716 | 1.60 | 1.83400 | 37.3 |
| 41 | 41.303 | 3.91 | 1.74077 | 27.8 |
| 42 | 119.417 | (variable) |  |  |
| 43 | 136.097 | 1.60 | 1.90366 | 31.3 |
| 44 | 49.860 | 4.96 | 1.74077 | 27.8 |
| 45 | −838.454 | (variable) |  |  |
| 46 | ∞ | 2.00 | 1.51633 | 64.1 |
| 47 | ∞ | (variable) |  |  |
| Image Plane | ∞ |  |  |  |

ASPHERICAL SURFACE DATA

21st surface

K = 0.00000e+000 A4 = −9.09245e−008 A6 = 1.13476e−010
A8 = −6.46254e−013

VARIOUS DATA
Zoom Ratio 19.18

|  | Wide-Angle | Middle | Telephoto |
|---|---|---|---|
| Focal Length: | 30.50 | 302.00 | 585.00 |
| Fno: | 4.00 | 6.76 | 8.00 |
| Half Angle of View (°): | 35.35 | 4.10 | 2.12 |
| Image Height: | 21.64 | 21.64 | 21.64 |
| Overall Lens Length: | 311.33 | 424.37 | 487.84 |
| BF | 36.69 | 74.87 | 96.76 |
| d 6 | 1.20 | 124.37 | 145.66 |
| d17 | 95.86 | 9.66 | 3.11 |
| d23 | 5.92 | 19.85 | 26.23 |
| d26 | 22.44 | 8.51 | 2.13 |
| d31 | 2.25 | 3.60 | 2.25 |
| d34 | 18.66 | 27.29 | 63.88 |
| d39 | 7.65 | 32.31 | 22.77 |
| d42 | 2.14 | 5.39 | 6.53 |
| d45 | 34.26 | 72.43 | 94.33 |
| d47 | 1.12 | 1.12 | 1.12 |

ZOOM LENS UNIT DATA

| Lens Unit | Starting Surface | Focal Length |
|---|---|---|
| 1 | 1 | 221.60 |
| 2 | 7 | −32.93 |
| 3 | 18 | 87.50 |
| 4 | 24 | −133.21 |
| 5 | 27 | 40.75 |
| 6 | 32 | −54.80 |
| 7 | 35 | 87.57 |
| 8 | 40 | −69.75 |
| 9 | 43 | 234.68 |
| 10 | 46 | ∞ |

Numerical Example 4

Unit: mm

SURFACE DATA

| Surface number | r | d | nd | vd |
|---|---|---|---|---|
| 1 | ∞ | 1.80 | | |
| 2 | 194.406 | 4.00 | 1.80610 | 33.3 |
| 3 | 124.165 | 11.36 | 1.49700 | 81.5 |
| 4 | 6070.305 | 0.20 | | |
| 5 | 135.830 | 8.19 | 1.49700 | 81.5 |
| 6 | 665.019 | (variable) | | |
| 7 | 268.674 | 2.40 | 1.89190 | 37.1 |
| 8 | 30.253 | 11.04 | | |
| 9 | −115.334 | 2.00 | 1.89190 | 37.1 |
| 10 | 97.319 | 0.20 | | |
| 11 | 74.522 | 9.85 | 1.84666 | 23.8 |
| 12 | −53.753 | 0.21 | | |
| 13 | −57.436 | 2.00 | 1.85150 | 40.8 |
| 14 | 109.786 | 0.21 | | |
| 15 | 70.054 | 6.01 | 1.64769 | 33.8 |
| 16 | −181.773 | 2.00 | 1.90366 | 31.3 |
| 17 | −504.471 | (variable) | | |
| 18 (diaphragm) | ∞ | 1.50 | | |
| 19 | 43.992 | 4.79 | 1.78472 | 25.7 |
| 20 | −669.611 | 0.20 | | |
| 21 | 32.308 | 6.08 | 1.49700 | 81.5 |
| 22 | −193.258 | 1.45 | 1.85478 | 24.8 |
| 23 | 31.277 | (variable) | | |
| 24 | −95.631 | 2.99 | 1.65100 | 56.2 |
| 25 | −38.121 | 1.30 | 1.59522 | 67.7 |
| 26 | 247.918 | (variable) | | |
| 27 | 126.296 | 3.98 | 1.72000 | 46.0 |
| 28 | −68.604 | 0.20 | | |
| 29 | 50.825 | 6.32 | 1.59522 | 67.7 |
| 30 | −40.817 | 1.50 | 1.90366 | 31.3 |
| 31 | −226.260 | (variable) | | |
| 32 | −80.833 | 5.20 | 1.84666 | 23.8 |
| 33 | −22.584 | 1.30 | 1.80610 | 33.3 |
| 34 | 68.959 | (variable) | | |
| 35 | 148.711 | 1.60 | 1.80518 | 25.4 |
| 36 | 89.855 | 5.66 | 1.53172 | 48.8 |
| 37 | −66.961 | 0.20 | | |
| 38 | 254.798 | 3.50 | 1.69350 | 50.8 |
| 39 | −111.810 | 10.06 | | |
| 40 | −76.621 | 1.60 | 1.89190 | 37.1 |
| 41 | 53.698 | 3.33 | 1.74077 | 27.8 |
| 42 | 147.053 | (variable) | | |
| 43 | 209.982 | 1.60 | 1.85883 | 30.0 |
| 44 | 61.738 | 4.47 | 1.74077 | 27.8 |
| 45 | −401.314 | (variable) | | |
| 46 | ∞ | 2.00 | 1.51633 | 64.1 |
| 47 | ∞ | (variable) | | |
| Image Plane | ∞ | | | |

VARIOUS DATA
Zoom Ratio 19.18

| | Wide-Angle | Middle | Telephoto |
|---|---|---|---|
| Focal Length: | 30.50 | 302.00 | 585.00 |
| Fno: | 4.00 | 6.76 | 8.00 |
| Half Angle of View (°): | 35.35 | 4.10 | 2.12 |
| Image Height: | 21.64 | 21.64 | 21.64 |
| Overall Lens Length: | 511.33 | 428.68 | 485.25 |
| BF: | 34.87 | 79.87 | 100.91 |
| d 6 | 1.20 | 130.90 | 147.97 |
| d17 | 97.73 | 16.40 | 2.00 |
| d23 | 5.55 | 15.73 | 19.58 |
| d26 | 16.03 | 5.85 | 2.00 |
| d31 | 2.63 | 7.22 | 3.89 |
| d34 | 20.89 | 32.28 | 41.83 |
| d42 | 2.15 | 10.15 | 36.77 |
| d45 | 32.42 | 77.43 | 98.47 |
| d47 | 1.13 | 1.13 | 1.13 |

ZOOM LENS UNIT DATA

| Lens Unit | Starting Surface | Focal Length |
|---|---|---|
| 1 | 1 | 223.82 |
| 2 | 7 | −35.08 |
| 3 | 18 | 94.97 |
| 4 | 24 | −128.75 |
| 5 | 27 | 40.99 |
| 6 | 32 | −48.23 |
| 7 | 35 | 249.80 |
| 8 | 43 | 249.16 |
| 9 | 46 | ∞ |

Numerical Example 5

Unit: mm

SURFACE DATA

| Surface number | r | d | nd | vd |
|---|---|---|---|---|
| 1 | ∞ | 1.80 | | |
| 2 | 223.328 | 4.00 | 1.80610 | 33.3 |
| 3 | 132.423 | 11.89 | 1.49700 | 81.5 |
| 4 | −1247.019 | 0.20 | | |
| 5 | 122.522 | 8.19 | 1.49700 | 81.5 |
| 6 | 499.314 | (variable) | | |
| 7 | 187.138 | 2.40 | 1.89190 | 37.1 |
| 8 | 27.309 | 10.60 | | |
| 9 | −142.381 | 2.00 | 1.89190 | 37.1 |
| 10 | 124.731 | 0.20 | | |
| 11 | 58.038 | 9.59 | 1.84666 | 23.8 |
| 12 | −55.640 | 0.70 | | |
| 13 | −50.906 | 2.01 | 1.89190 | 37.1 |
| 14 | 119.208 | 0.20 | | |
| 15 | 67.622 | 6.01 | 1.72825 | 28.5 |
| 16 | −107.389 | 2.01 | 1.90366 | 31.3 |
| 17 | 249.755 | (variable) | | |
| 18 (diaphragm) | ∞ | 1.50 | | |
| 19 | 48.129 | 4.04 | 1.78472 | 25.7 |
| 20 | −1118.112 | 0.20 | | |
| 21* | 26.402 | 5.86 | 1.49700 | 81.5 |
| 22 | 785.851 | 2.38 | 1.85478 | 24.8 |
| 23 | 26.820 | (variable) | | |
| 24 | −98.798 | 3.83 | 1.60738 | 56.8 |
| 25 | −28.130 | 1.30 | 1.59522 | 67.7 |
| 26 | 282.952 | (variable) | | |
| 27 | 105.994 | 3.98 | 1.72000 | 46.0 |
| 28 | −68.403 | 0.20 | | |
| 29 | 51.096 | 6.32 | 1.59522 | 67.7 |
| 30 | −37.214 | 1.50 | 1.90366 | 31.3 |
| 31 | −155.337 | (variable) | | |
| 32 | −98.441 | 4.86 | 1.84666 | 23.8 |
| 33 | −21.653 | 1.30 | 1.80610 | 33.3 |
| 34 | 76.500 | (variable) | | |
| 35 | 97.831 | 1.60 | 1.80518 | 25.4 |
| 36 | 51.214 | 4.96 | 1.53172 | 48.8 |
| 37 | −202.579 | 0.20 | | |
| 38 | 95.176 | 3.50 | 1.51633 | 64.1 |
| 39 | −244.547 | (variable) | | |
| 40 | 912.738 | 1.60 | 1.90366 | 31.3 |
| 41 | 42.335 | 1.77 | 1.74077 | 27.8 |
| 42 | 48.385 | (variable) | | |
| 43 | 128.540 | 1.60 | 1.53775 | 74.7 |
| 44 | 42.172 | 5.08 | 1.74077 | 27.8 |
| 45 | 444.091 | (variable) | | |
| 46 | ∞ | 2.00 | 1.51633 | 64.1 |
| 47 | ∞ | (variable) | | |
| Image Plane | ∞ | | | |

-continued

Unit: mm

ASPHERICAL SURFACE DATA

21st surface

K = 0.00000e+000 A 4 = −1.50048e−007 A 6 = 2.39227e−010
A 8 = 1.03096e−012

VARIOUS DATA
Zoom Ratio 19.20

| | Wide-Angle | Middle | Telephoto |
|---|---|---|---|
| Focal Length: | 30.50 | 300.82 | 585.58 |
| Fno: | 4.00 | 6.76 | 8.00 |
| Half Angle of View (°): | 35.35 | 4.11 | 2.12 |
| Image Height: | 21.64 | 21.64 | 21.64 |
| Overall Lens Length: | 289.33 | 402.18 | 469.33 |
| BF: | 35.16 | 78.40 | 97.38 |
| d 6 | 1.20 | 121.18 | 140.76 |
| d17 | 82.16 | 8.59 | 2.79 |
| d23 | 5.50 | 14.07 | 16.99 |
| d26 | 13.49 | 4.92 | 2.00 |
| d31 | 2.28 | 5.17 | 4.43 |
| d34 | 21.20 | 21.20 | 61.71 |
| d39 | 5.14 | 20.71 | 7.87 |
| d42 | 3.82 | 8.56 | 16.02 |
| d45 | 32.71 | 75.95 | 94.93 |
| d47 | 1.13 | 1.13 | 1.13 |

ZOOM LENS UNIT DATA

| Lens Unit | Starting Surface | Focal Length |
|---|---|---|
| 1 | 1 | 211.86 |
| 2 | 7 | −30.63 |
| 3 | 18 | 93.83 |
| 4 | 24 | −127.34 |
| 5 | 27 | 37.97 |
| 6 | 32 | −57.11 |
| 7 | 35 | 77.77 |
| 8 | 40 | −54.96 |
| 9 | 43 | 135.88 |
| 10 | 46 | ∞ |

Table 1 indicates a relationship between each of the above inequalities and each numerical example.

TABLE 1

| | | NUMERICAL EXAMPLES | | | | |
|---|---|---|---|---|---|---|
| | | 1 | 2 | 3 | 4 | 5 |
| Exp. 1 | f1/|f2| | 6.72 | 6.1 | 6.73 | 6.38 | 6.92 |
| Exp. 2 | m1/f1 | 0.8 | 0.81 | 0.8 | 0.78 | 0.85 |
| Exp. 3 | fr/|f2| | 4.45 | 3.79 | 4.67 | 4.25 | 4.49 |
| Exp. 4 | f1/f3 | 2.46 | 2.26 | 2.53 | 2.36 | 2.26 |
| Exp. 5 | |f2|/f3 | 0.37 | 0.37 | 0.38 | 0.37 | 0.33 |
| Exp. 6 | f2/ff | 0.59 | 0.59 | 0.6 | 0.73 | 0.54 |
| Exp. 7 | |f2|/skw | 1.15 | 1.03 | 0.9 | 1.01 | 0.87 |
| Exp. 8 | f3/skw | 3.14 | 2.78 | 2.38 | 2.72 | 2.67 |
| Exp. 9 | f2/fsi | 0.26 | 0.27 | 0.25 | 0.27 | 0.24 |
| Exp. 10 | f1/ft | 0.39 | 0.38 | 0.38 | 0.38 | 0.36 |
| Exp. 11 | |f2|/fw | 1.1 | 1.19 | 1.08 | 1.15 | 1 |
| Exp. 12 | f3/ft | 0.16 | 0.17 | 0.15 | 0.16 | 0.16 |
| | fw | 30.5 | 30.5 | 30.5 | 30.5 | 30.5 |
| | ft | 585 | 585 | 585 | 585 | 585.58 |
| | skw | 29.33 | 35.46 | 36.69 | 34.87 | 35.16 |
| | f1 | 225.8 | 222.09 | 221.6 | 223.82 | 211.86 |
| | f2 | −33.6 | −36.4 | −32.93 | −35.08 | −30.63 |
| | f3 | 91.96 | 98.44 | 87.5 | 94.97 | 93.83 |
| | f4 | −128.56 | −136.57 | −133.21 | −128.75 | −127.34 |
| | f5 | 42.29 | 42.9 | 40.75 | 40.99 | 37.97 |
| | f6 | −56.75 | −62.12 | −54.8 | −48.23 | −57.11 |
| | f7 | 67.68 | 312.95 | 87.57 | 249.8 | 77.77 |
| | f8 | −69.76 | — | −69.75 | 249.16 | −54.96 |

TABLE 1-continued

| | NUMERICAL EXAMPLES | | | | |
|---|---|---|---|---|---|
| | 1 | 2 | 3 | 4 | 5 |
| f9 | — | — | 234.68 | — | 135.88 |
| fr | 149.67 | 138.01 | 153.62 | 149.23 | 137.44 |
| m1 | 179.76 | 180 | 176.51 | 173.91 | 180 |
| ff | −56.75 | −62.12 | −54.8 | −48.23 | −57.11 |

According to each example, it is possible to realize a small-sized zoom lens having both a high zoom ratio and good optical performance.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A zoom lens including, in order from an object side to an image side, a first lens unit having a positive refractive power, a second lens unit having a negative refractive power, a third lens unit having a positive refractive power, and a rear group that includes a plurality of lens units having negative refractive powers and a plurality of lens units having positive refractive powers, each distance between adjacent lens units changing during zooming, wherein during zooming from a wide-angle end to a telephoto end, the first lens unit moves to the object side, and the second lens unit moves to the image side and thereafter moves to the object side, wherein a lens disposed on the most image side in the zoom lens has a positive refractive power, wherein a following inequalities are satisfied:

$$5.50 < f1/|f2| < 7.50 \quad 0.17 < f2/fsi < 0.38$$

where f1 represents a focal length of the first lens unit, f2 represents a focal length of the second lens unit, and fsi represents a focal length of a lens unit having a negative refractive power closest to a diaphragm in the rear group.

2. The zoom lens according to claim 1,
wherein a following inequality is satisfied:

$$2.71 < fr/|f2| < 6.53$$

where fr represents a combined focal length of the rear unit at the wide-angle end.

3. The zoom lens according to claim 1,
wherein a following inequality is satisfied:

$$1.61 < f1/f3 < 3.55$$

where f3 represents a focal length of the third lens unit.

4. The zoom lens according to claim 1,
wherein a following inequality is satisfied:

$$0.23 < |f2|/f3 < 0.53$$

where f3 represents a focal length of the third lens unit.

5. The zoom lens according to claim 1,
wherein a following inequality is satisfied:

$$0.38 < f2/ff < 1.02$$

where ff represents a focal length of a lens unit having a focal length of a smallest absolute value in the plurality of lens units having the negative refractive powers.

6. The zoom lens according to claim 1,
wherein a following inequality is satisfied:

$$0.62 < |f2|/skw < 1.60$$

where skw represents a back focus at the wide-angle end.

7. The zoom lens according to claim 1,
wherein a following inequality is satisfied:

$$1.70 < f3/skw < 4.39$$

where f3 represents a focal length of the third lens unit and skw represents a back focus at the wide-angle end.

8. The zoom lens according to claim 1,
wherein a following inequality is satisfied:

$$0.26 < f1/ft < 0.54$$

where ft represents a focal length of the zoom lens at the telephoto end.

9. The zoom lens according to claim 1,
wherein a following inequality is satisfied:

$$0.72 < |f2|/fw < 1.67$$

where fw represents a focal length of the zoom lens at the wide-angle end.

10. The zoom lens according to claim 1,
wherein a following inequality is satisfied:

$$0.11 < f3/ft < 0.24$$

where f3 represents a focal length of the third lens unit, and ft represents a focal length of the zoom lens at the telephoto end.

11. The zoom lens according to claim 1,
wherein during image stabilization, the lens unit having the negative refractive power closest to the diaphragm in the rear unit moves in a direction including a component of a direction orthogonal to an optical axis.

12. The zoom lens according to claim 5,
wherein during focusing, the lens unit having the focal length of the smallest absolute value in the plurality of lens units having the negative refractive powers moves.

13. The zoom lens according to claim 1,
wherein during zooming from the wide-angle end to the telephoto end, all the lens units included in the rear unit move to the object side.

14. The zoom lens according to claim 1,
wherein the rear unit includes, in order from the object side to the image side, a fourth lens unit having a negative refractive power, a fifth lens unit having a positive refractive power, a sixth lens unit having a negative refractive power, and a seventh lens unit having a positive refractive power.

15. The zoom lens according to claim 1,
wherein the rear unit includes, in order from the object side to the image side, a fourth lens unit having a negative refractive power, a fifth lens unit having a positive refractive power, a sixth lens unit having a negative refractive power, a seventh lens unit having a positive refractive power, and an eighth lens unit having a negative refractive power.

16. The zoom lens according to claim 1,
wherein the rear unit includes, in order from the object side to the image side, a fourth lens unit having a negative refractive power, a fifth lens unit having a positive refractive power, a sixth lens unit having a negative refractive power, a seventh lens unit having a positive refractive power, an eighth lens unit having a negative refractive power, and a nineth lens unit having a positive refractive power.

17. The zoom lens according to claim 1,
wherein the rear unit includes, in order from the object side to the image side, a fourth lens unit having a negative refractive power, a fifth lens unit having a positive refractive power, a sixth lens unit having a negative refractive power, a seventh lens unit having a positive refractive power, and an eighth lens unit having a positive refractive power.

18. The zoom lens according to claim 14,
wherein the fourth lens unit is disposed on a position closest to a diaphragm in the rear unit.

19. An image pickup apparatus comprising:
a zoom lens; and
a sensor configured to receive light of an image formed by the zoom lens,
wherein the zoom lens including, in order from an object side to an image side, a first lens unit having a positive refractive power, a second lens unit having a negative refractive power, a third lens unit having a positive refractive power, and a rear group that includes a plurality of lens units having negative refractive powers and a plurality of lens units having positive refractive powers, each distance between adjacent lens units changing during zooming,
wherein during zooming from a wide-angle end to a telephoto end, the first lens unit moves to the object side, and the second lens unit moves to the image side and thereafter moves to the object side,
wherein a lens disposed on the most image side in the zoom lens has a positive refractive power,
wherein a following inequalities are satisfied:

$$5.50 < f1/|f2| < 7.50 \quad 0.17 < f2/fsi < 0.38$$

where f1 represents a focal length of the first lens unit, f2 represents a focal length of the second lens unit, and fsi represents a focal length of a lens unit having a negative refractive power closest to a diaphragm in the rear group.

20. A zoom lens including, in order from an object side to an image side, a first lens unit having a positive refractive power, a second lens unit having a negative refractive power, a third lens unit having a positive refractive power, and a rear group that includes a plurality of lens units, each distance between adjacent lens units changing during zooming,
wherein the rear group includes, in order from the object side to the image side, a fourth lens unit having a negative refractive power, a fifth lens unit having a positive refractive power, a sixth lens unit having a negative refractive power, a seventh lens unit having a positive refractive power, and an eighth lens unit having a negative refractive power,
wherein during zooming from a wide-angle end to a telephoto end, the first lens unit moves to the object side, and the second lens unit moves to the image side and thereafter moves to the object side,
wherein a lens disposed on the most image side in the zoom lens has a positive refractive power,
wherein a following inequality is satisfied:

$$5.50 < f1/|f2| < 7.50$$

where f1 represents a focal length of the first lens unit, and f2 represents a focal length of the second lens unit.

21. A zoom lens including, in order from an object side to an image side, a first lens unit having a positive refractive power, a second lens unit having a negative refractive power, a third lens unit having a positive refractive power, and a rear group that includes a plurality of lens units, each distance between adjacent lens units changing during zooming,
wherein the rear group includes, in order from the object side to the image side, a fourth lens unit having a negative refractive power, a fifth lens unit having a positive refractive power, a sixth lens unit having a negative refractive power, a seventh lens unit having a positive refractive power, an eighth lens unit having a negative refractive power, and a nineth lens unit having a positive refractive power, wherein during zooming from a wide-angle end to a telephoto end, the first lens unit moves to the object side, and the second lens unit moves to the image side and thereafter moves to the object side, wherein a lens disposed on the most image side in the zoom lens has a positive refractive power, wherein a following inequality is satisfied:

$$5.50 < |f1/f2| < 7.50$$

where f1 represents a focal length of the first lens unit, and f2 represents a focal length of the second lens unit.

22. A zoom lens including, in order from an object side to an image side, a first lens unit having a positive refractive power, a second lens unit having a negative refractive power, a third lens unit having a positive refractive power, and a rear group that includes a plurality of lens units, each distance between adjacent lens units changing during zooming, wherein the rear group includes, in order from the object side to the image side, a fourth lens unit having a negative refractive power, a fifth lens unit having a positive refractive power, a sixth lens unit having a negative refractive power, a seventh lens unit having a positive refractive power, and an eighth lens unit having a positive refractive power, wherein during zooming from a wide-angle end to a telephoto end, the first lens unit moves to the object side, and the second lens unit moves to the image side and thereafter moves to the object side, wherein a lens disposed on the most image side in the zoom lens has a positive refractive power, wherein a following inequality is satisfied:

$$5.50 < |f1/f2| < 7.50$$

where f1 represents a focal length of the first lens unit, and f2 represents a focal length of the second lens unit.

* * * * *